Nov. 12, 1957  A. S. GUERARD, JR., ET AL  2,812,919
DRUM FILLING MACHINE

Original Filed Sept. 2, 1952

INVENTORS
ALBERT S. GUERARD, JR.
RUFUS P. RANNEY
DONALD H. REESE
BRUCE MACDONALD
BY
ATTORNEY

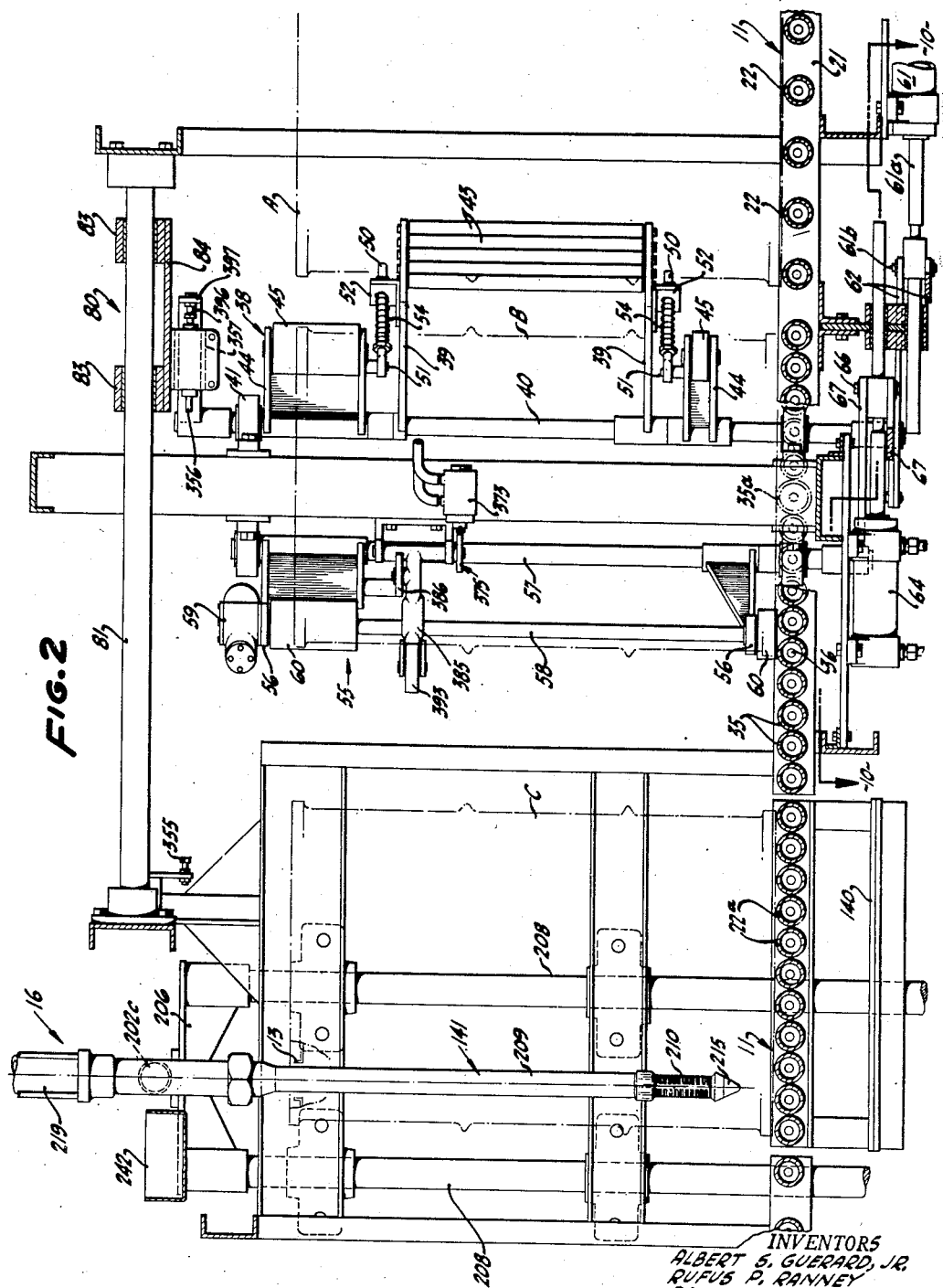
FIG. 2
INVENTORS
ALBERT S. GUERARD, JR.
RUFUS P. RANNEY
DONALD H. REESE
BRUCE MACDONALD
BY
ATTORNEY Nov. 12, 1957  A. S. GUERARD, JR., ET AL  2,812,919
DRUM FILLING MACHINE
Original Filed Sept. 2, 1952
17 Sheets—Sheet 4

INVENTORS
ALBERT S. GUERARD, JR.
RUFUS P. RANNEY
DONALD H. REESE
BRUCE MACDONALD
BY
ATTORNEY

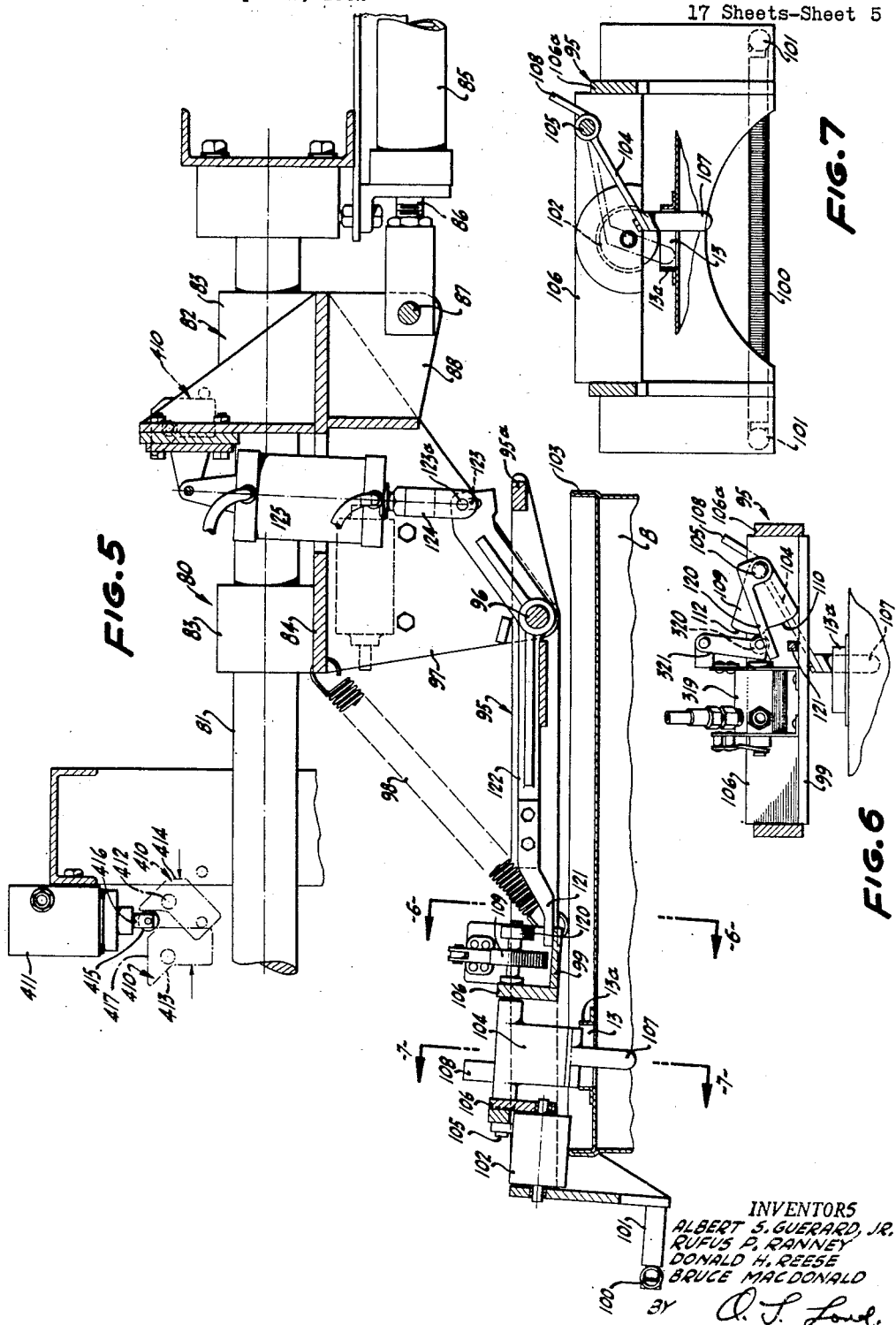

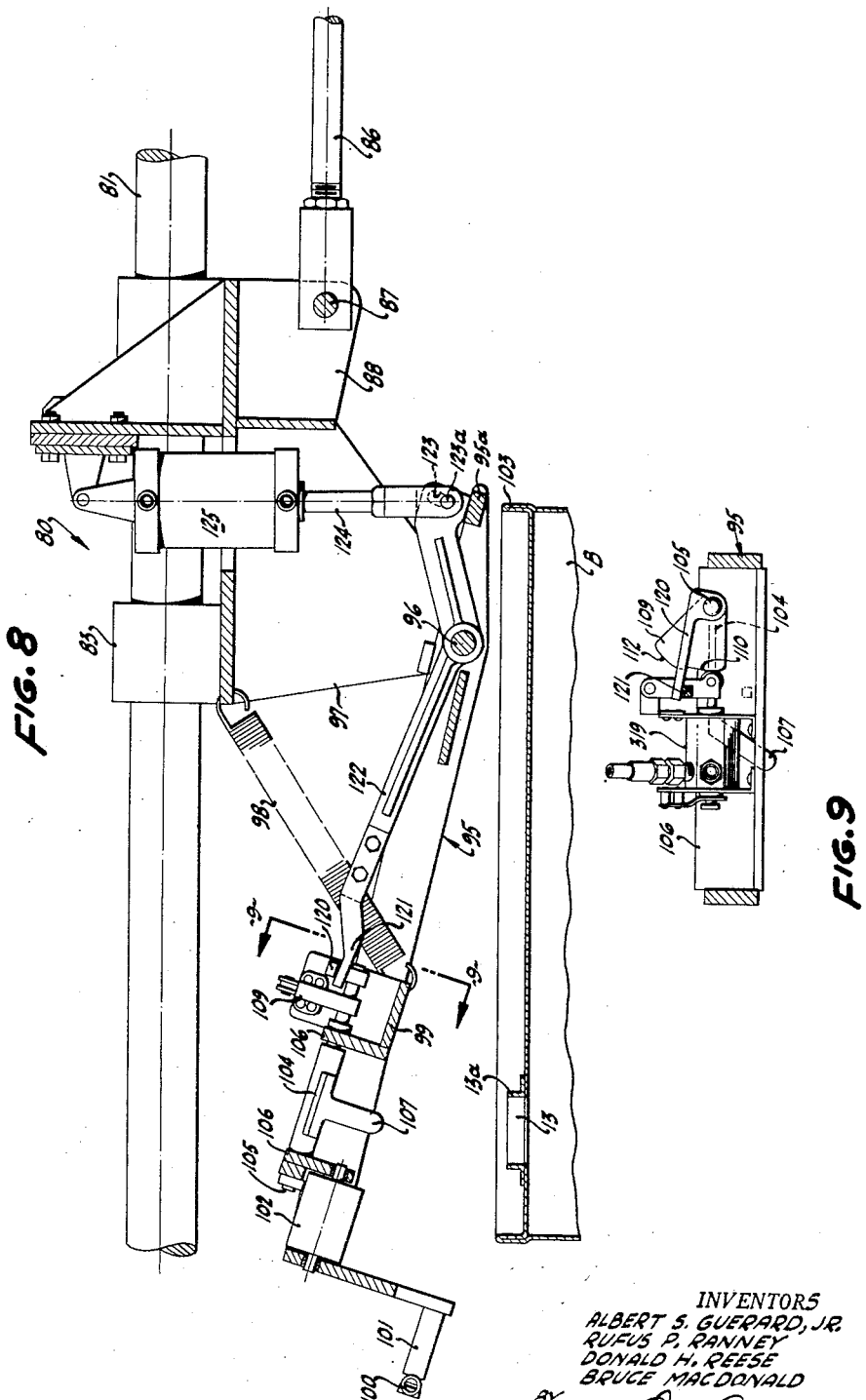

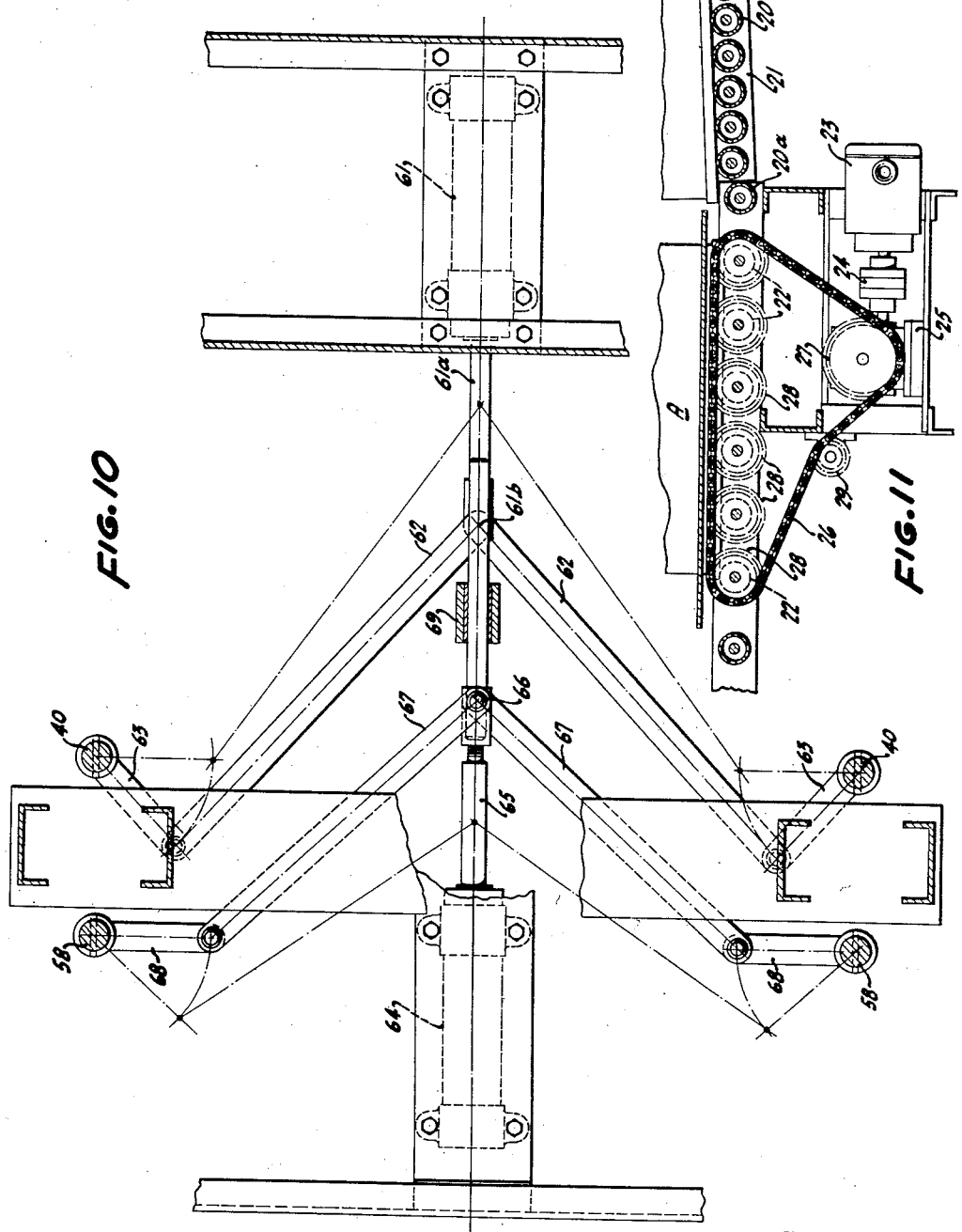

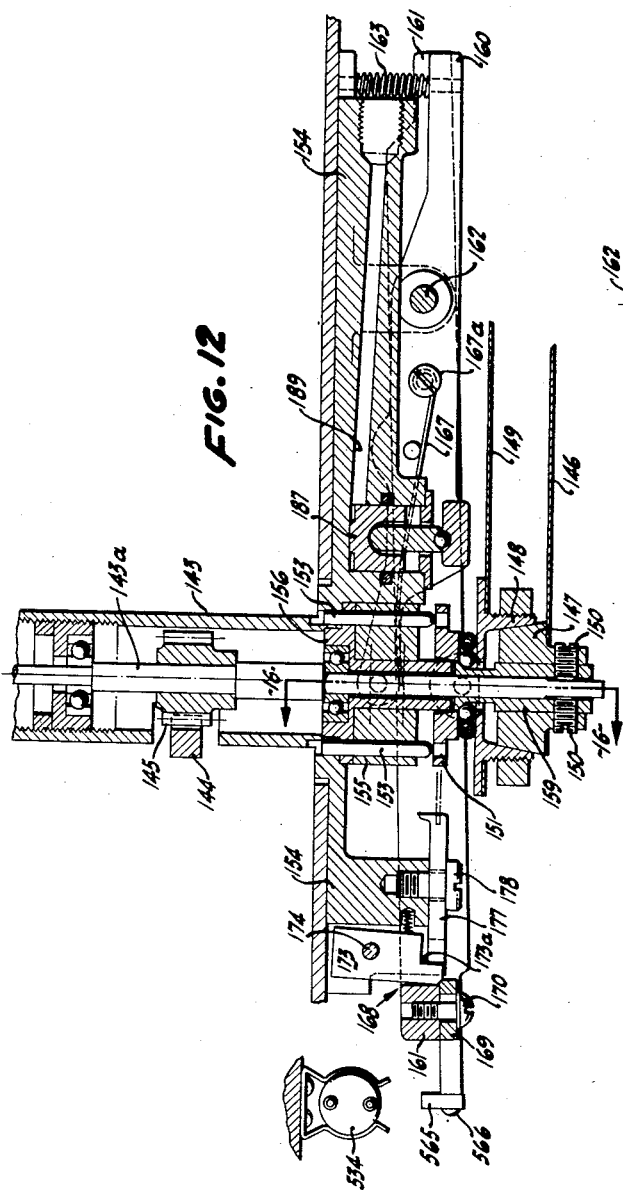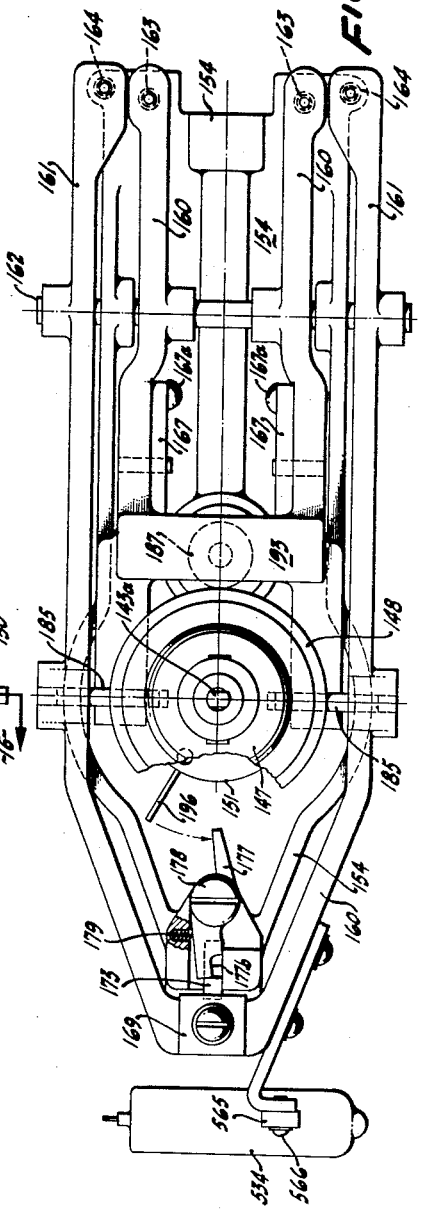

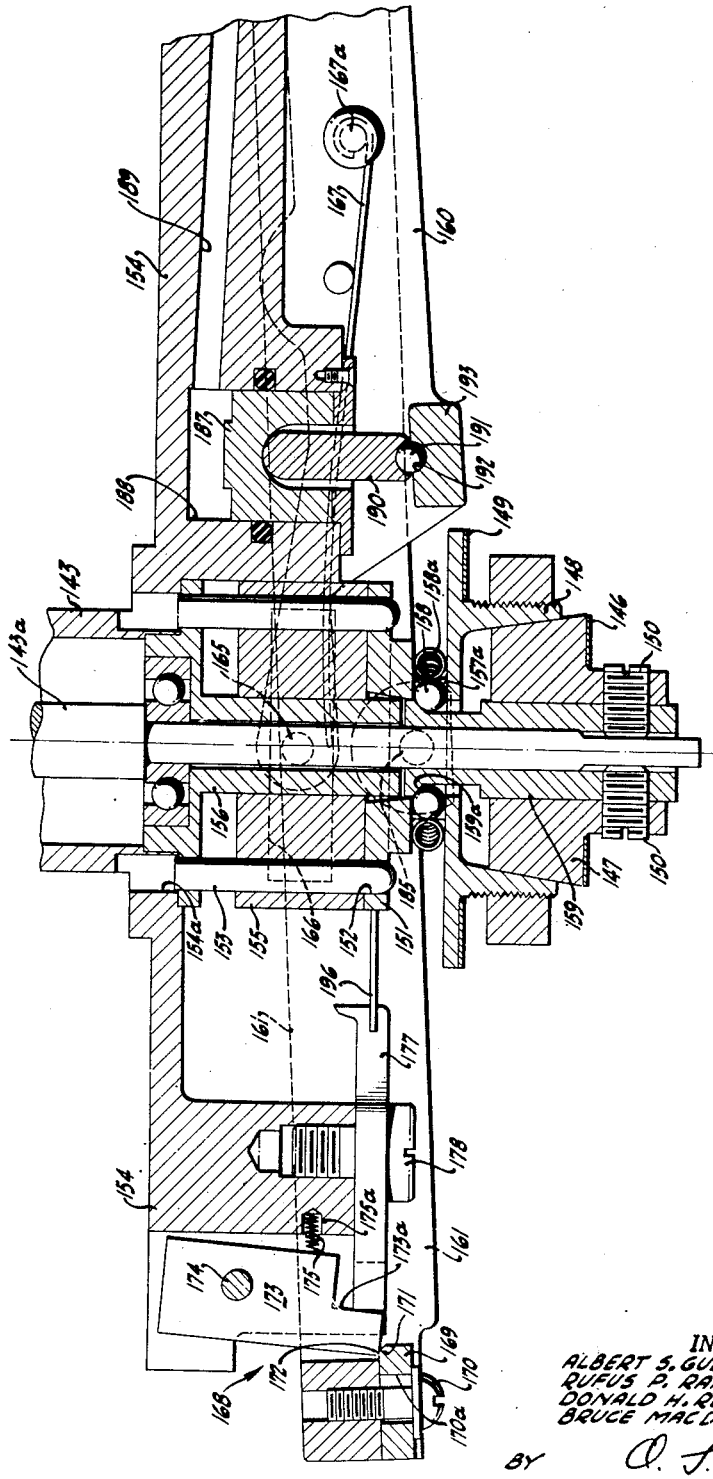

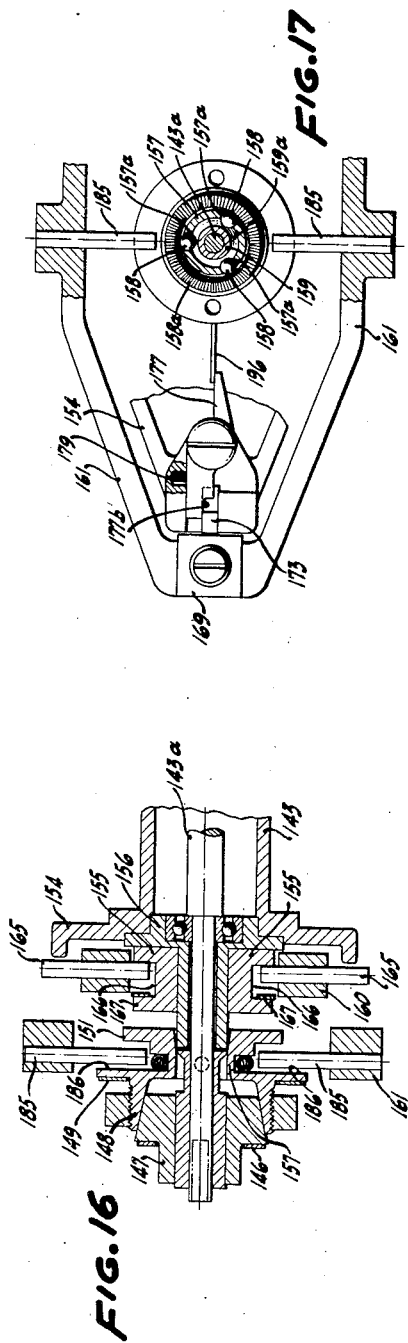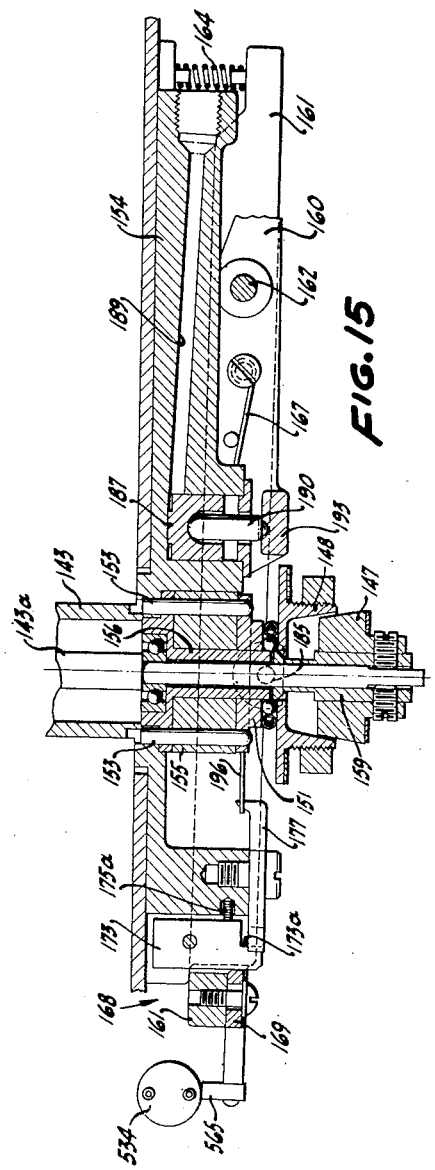

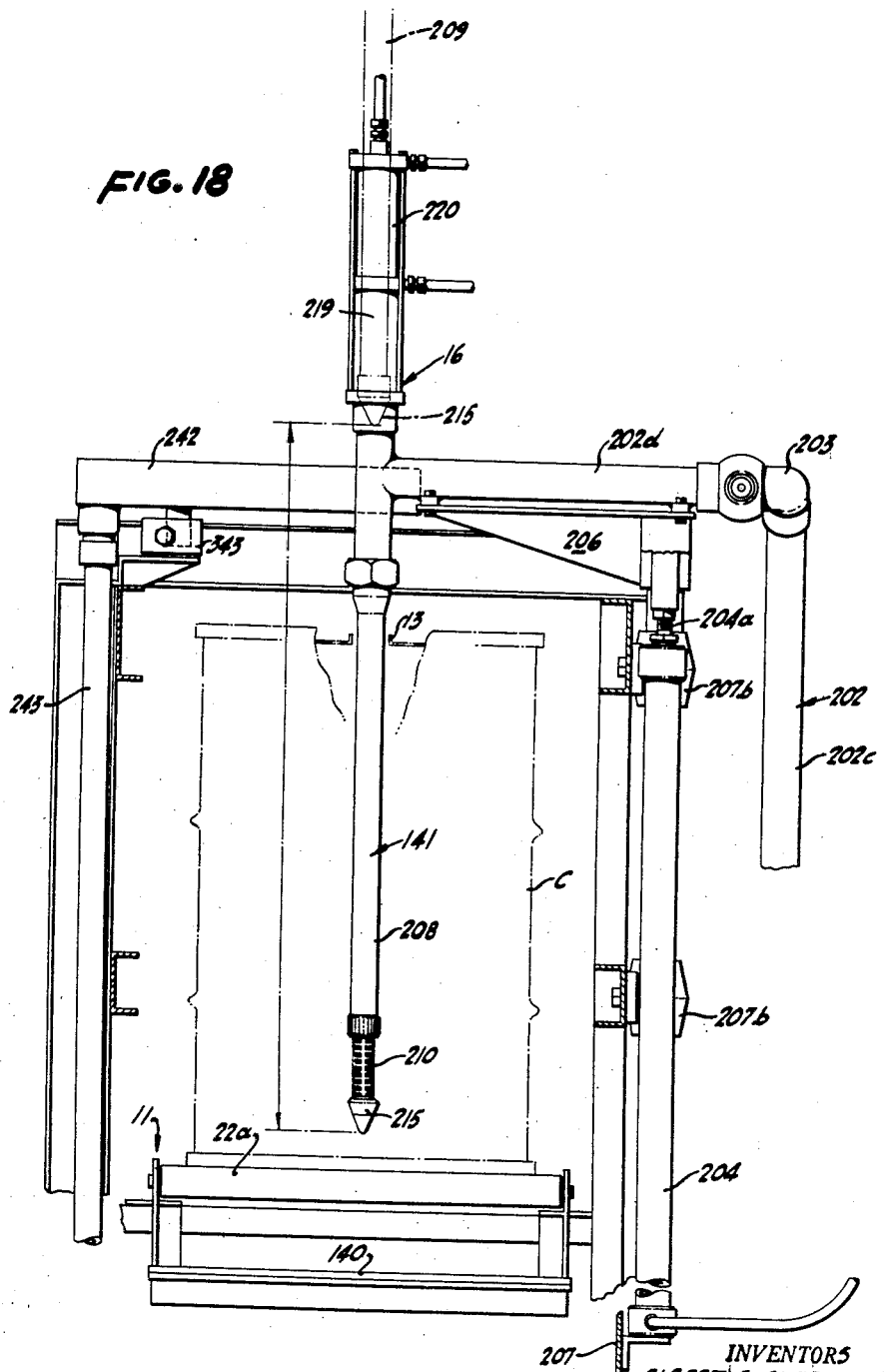

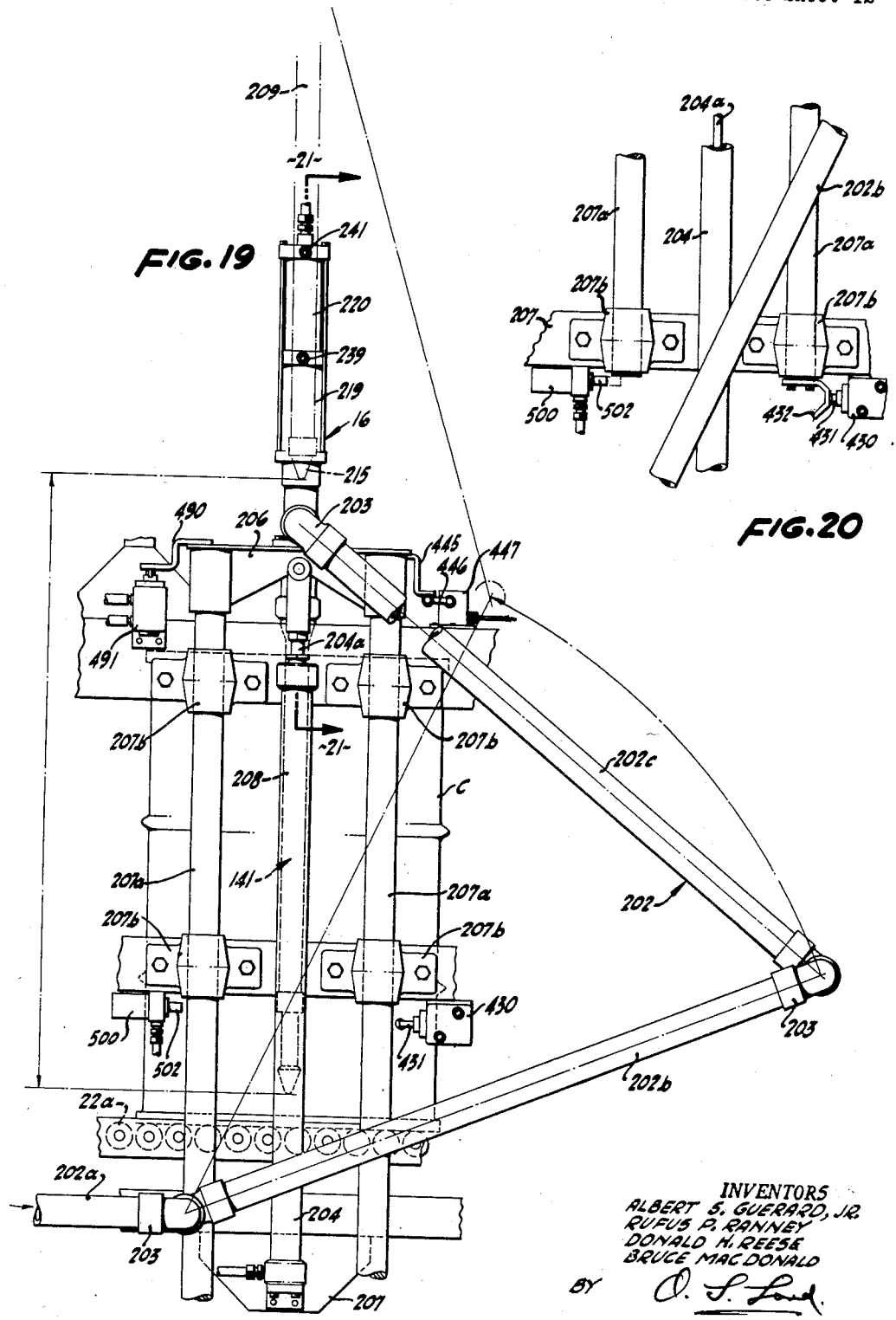

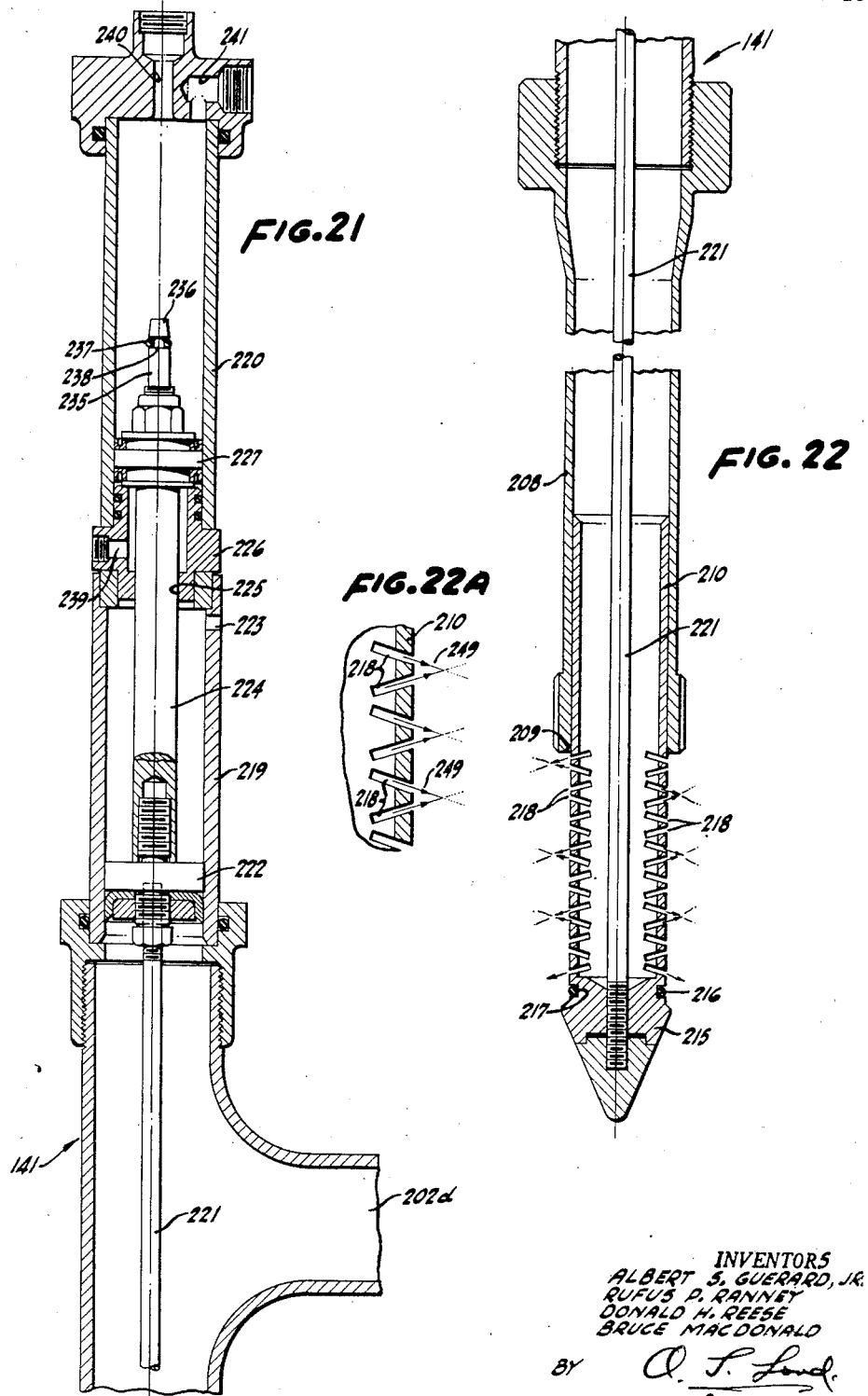
Nov. 12, 1957 A. S. GUERARD, JR., ET AL 2,812,919
DRUM FILLING MACHINE
Original Filed Sept. 2, 1952 17 Sheets-Sheet 13
INVENTORS
ALBERT S. GUERARD, JR.
RUFUS P. RANNEY
DONALD H. REESE
BRUCE MACDONALD
ATTORNEY

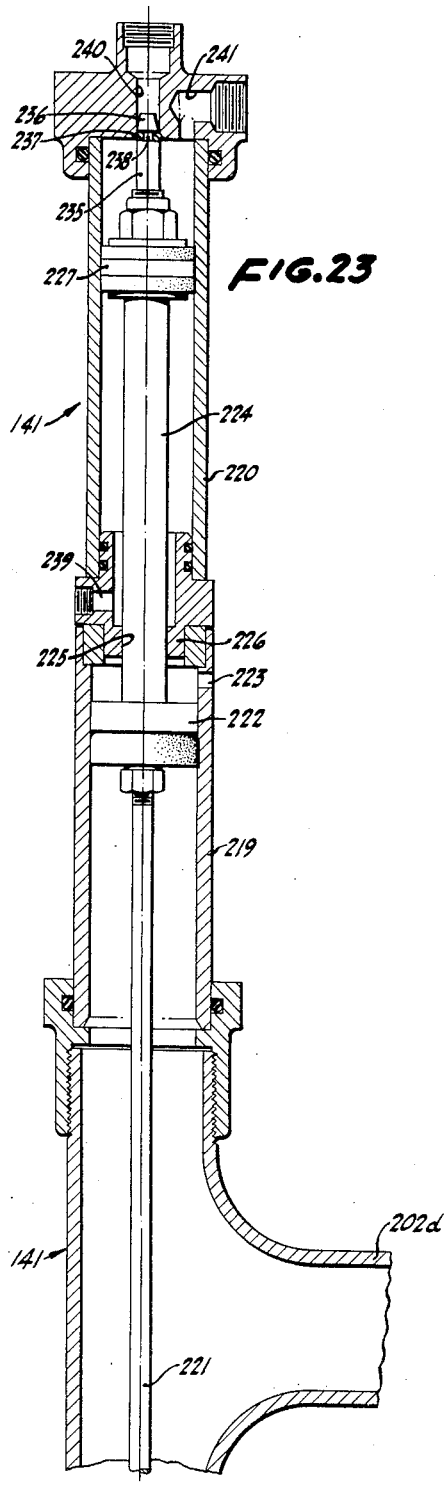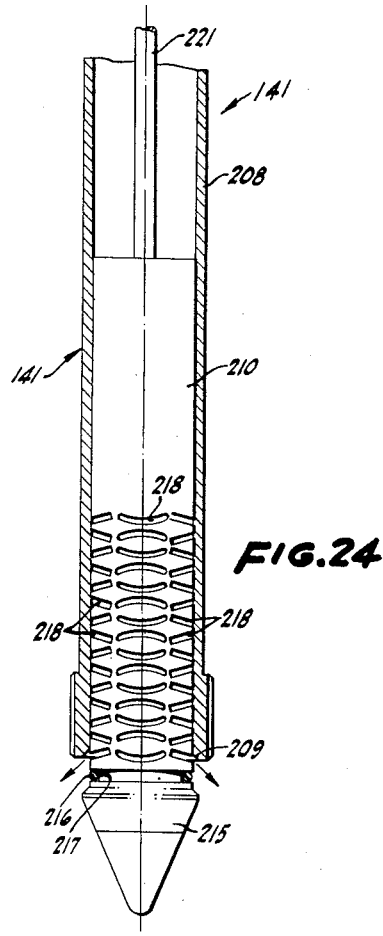

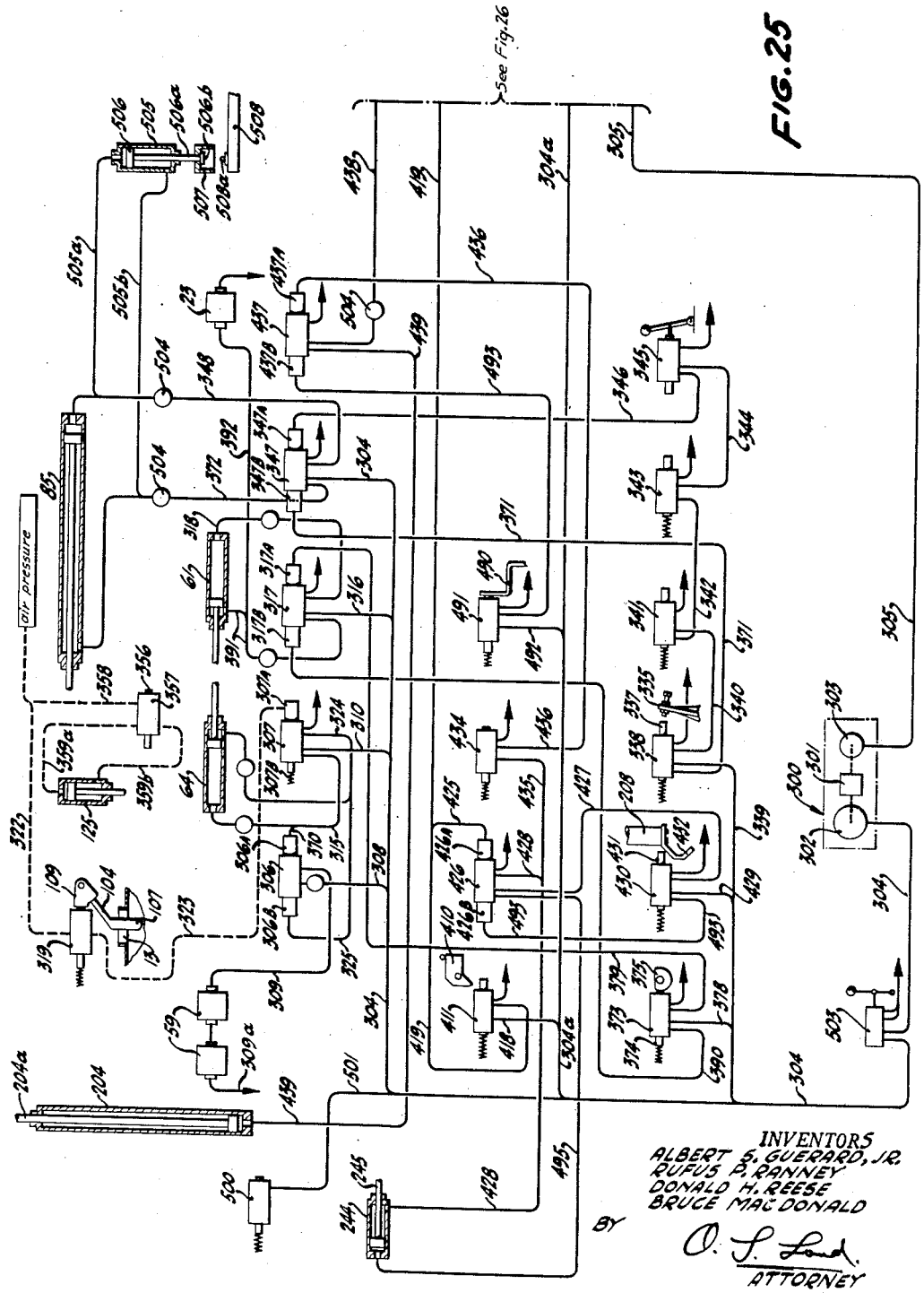

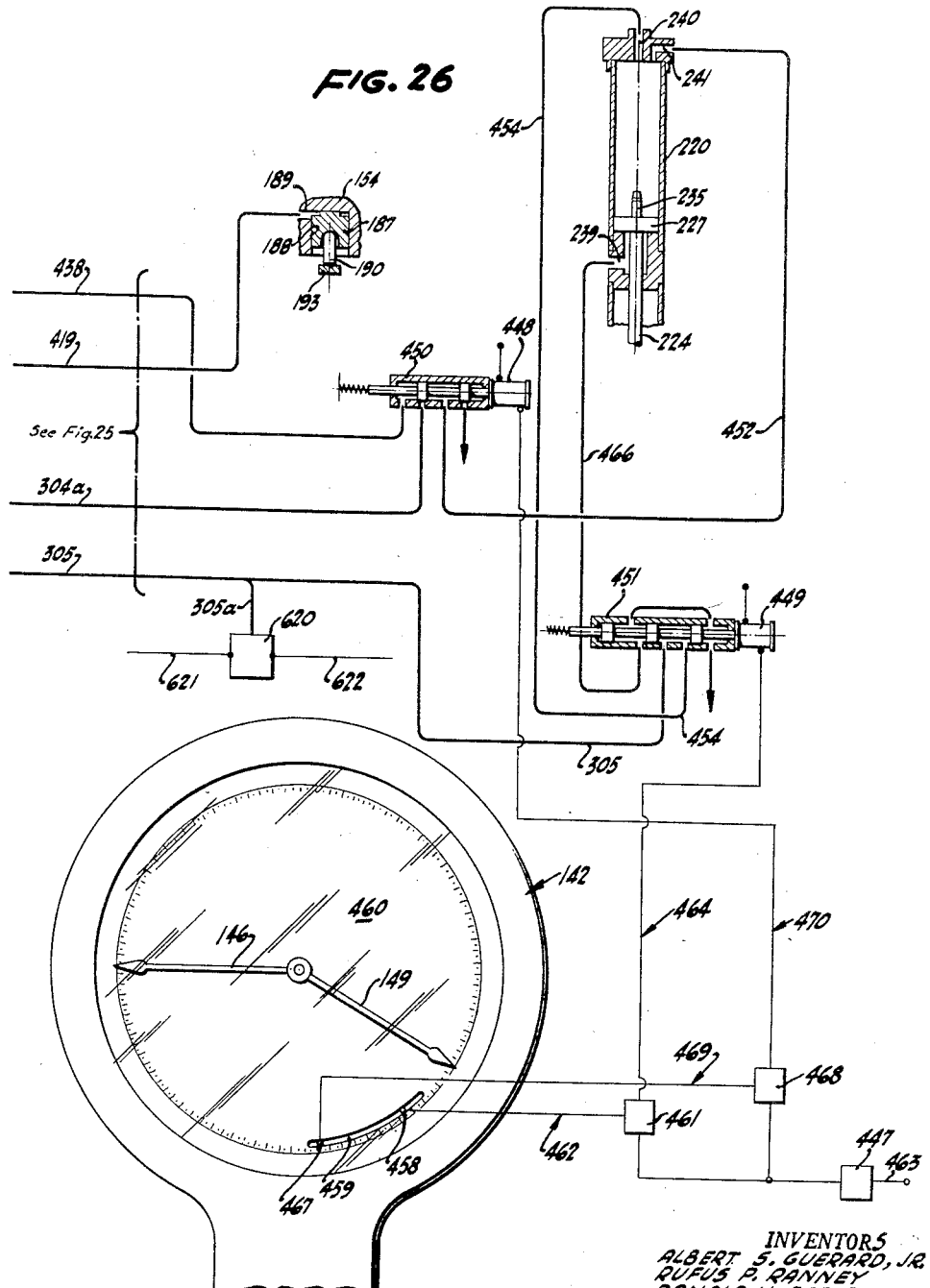

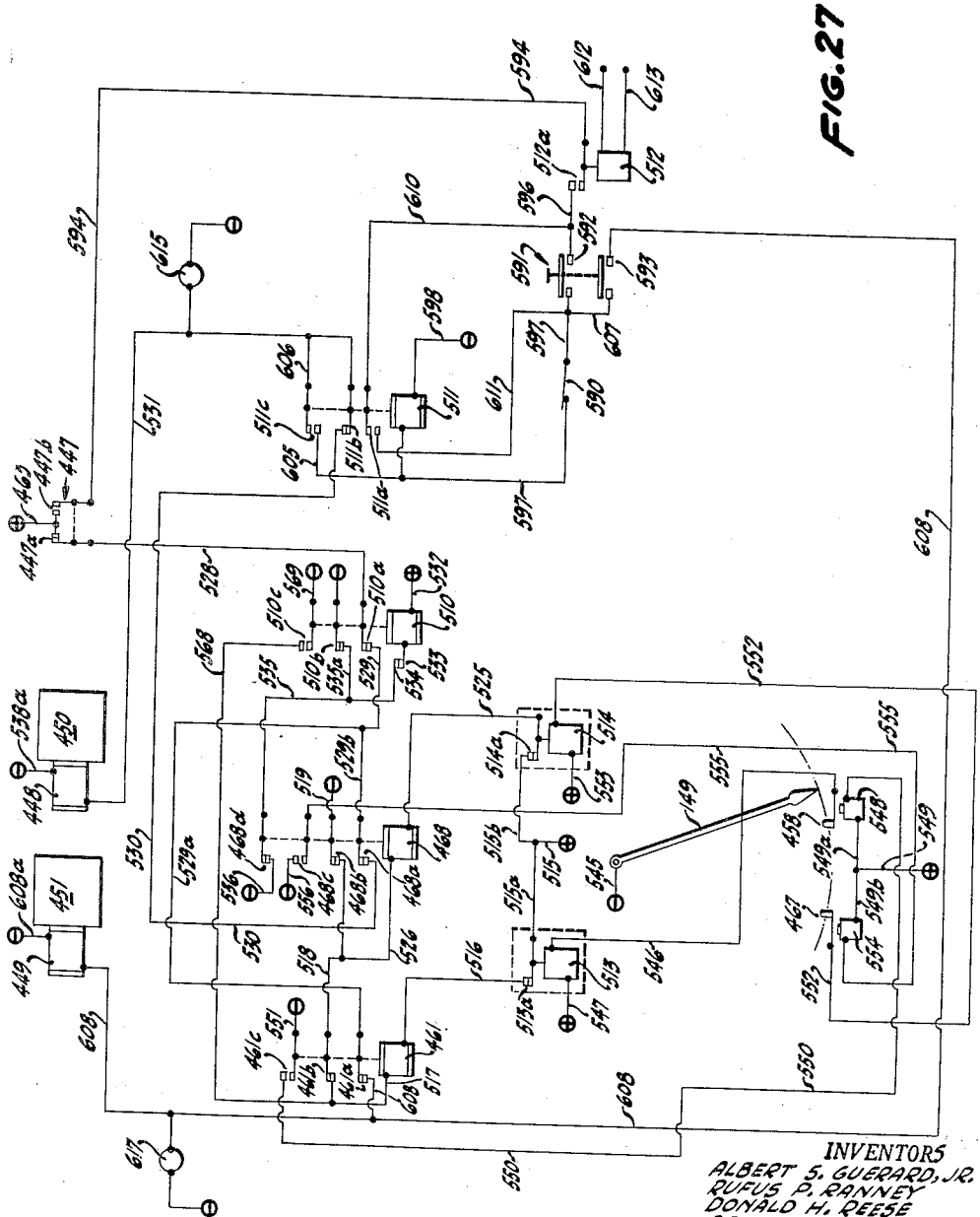

2,812,919

DRUM FILLING MACHINE

Albert S. Guerard, Jr., Berkeley, Rufus P. Ranney, San Rafael, Donald H. Reese, Lafayette, and Bruce Mac-Donald, South Gate, Calif., assignors, by mesne assignments, to California Research Corporation, San Francisco, Calif., a corporation of Delaware Original application September 2, 1952, Serial No. 307,554, now Patent No. 2,793,659, dated May 28, 1957. Divided and this application January 17, 1955, Serial No. 482,004

18 Claims. (Cl. 249—3)

This invention relates to apparatus for automatically filling drums, barrels and other vessels with liquid, more particularly for filling drums with lubricating oil, other hydrocarbon oils and liquids generally which are handled in large volume and are marketed in individual containers such as drums and barrels.

This application is a division of our copending application Serial No. 307,554, filed September 2, 1952, now Patent No. 2,793,659 entitled "Drum Filling Machine."

It is customary to ship and market lubricating oils, gasoline and kerosene in drums or barrels of 55 gallon capacity. For legal as well as business reasons it is necessary that each drum be filled with a predetermined quantity of liquid within fairly close tolerances.

Products of the character of lubricating oil, kerosene and gasoline are marketed in drums or barrels in large volume. From the standpoint of labor saving and to fill large orders on close schedules, it is desirable to conduct the drum or barrel filling operation automatically. Automatic means used for this purpose must be rapid in operation to justify any sizeable capital investment and it must be accurate to comply with the tolerance factor. Also, a machine of this character should not be overly complex and it should be capable of lengthy runs without shutdowns for servicing or repairs.

Heretofore only semi-automatic means have been available for this purpose. Such means leave a great deal to be desired from the standpoint of dependable automatic operation, speed of operation and satisfaction of the need for accurate filling.

It is an object of the present invention to provide improved automatic means for filling drums, barrels and the like with liquid products.

It is another object of the invention to provide an automatic drum filling means which is rapid in its operation.

A further object of the invention is to provide a barrel or drum filling means which is rapid, automatic and accurate in its operation and which will fill receptacles such as drums and barrels with a predetermined quantity of liquid within close tolerances.

Another object of the invention is to provide apparatus and method for filling vessels with liquid which are automatic in character and which will automatically tare the empty vessels, then fill them with a predetermined net weight of liquid, and which, if desired, will fill vessels, without a taring operation, to a predetermined gross weight.

Another object of the invention is to provide automatic filling apparatus of the general character and for the general purpose described which is capable of lengthy runs without shutdowns for repairs and adjustment.

Yet another object is to provide barrel or drum filling apparatus and method which satisfy the conditions of automatic operation, speed and accuracy and which can be used in large oil refineries and other manufacturing establishments wherein large quantities of liquid product require packaging in individual drums and barrels.

A further object of the invention is to provide apparatus whereby barrels, drums and like vessels with their bung holes in random position can be rapidly oriented to locate their bung holes in a predetermined position, such apparatus being simple in its structure and operation and being effective to maintain each oriented vessel in proper position while it is transported to a filling station.

Another object of the invention is to provide filling apparatus which can be rapidly extended through the bung hole of and into an oriented drum, barrel or other vessel to fill the same with liquid, and which can be throttled to diminish the rate of flow of liquid near the end of the filling operation, then shut off completely and withdrawn from the vessel.

Another object of the invention is to provide apparatus for automatically filling vessels, such as drums and barrels, with a liquid, such apparatus being capable of automatically taring each vessel, then filling it with a predetermined net weight of liquid and terminating the filling operation when such predetermined net weight is registered on a scale.

Yet another object is to provide means for rapidly filling vessels, such as drums having small bung holes, with liquid, e. g. for filling a fifty-five gallon drum in thirty seconds, without overflow of liquid due to foaming.

A further object is to provide automatic drum filling means capable of rapidly filling drums on a scale platform, whereby reaction of such platform to the flow of liquid is minimized.

These and other objects of the invention will be apparent from the ensuing description and the appended claims.

GENERAL DESCRIPTION

In general our mode of operation comprises the following sequence of steps: Drums (this being a term used hereinafter to exemplify receptacles which can be filled by the apparatus and method of the present invention), each having a bung hole or orifice for entry of liquid, are delivered by any suitable means, e. g., by gravity rollers or by positively driven rollers, to a first or bung locating station. Gates are provided at the entry and exit of such station which are operated by a mechanism hereinafter described to confine each drum, in its turn, at the locating station, and to open and close at appropriately timed intervals to allow entry of a drum having its bung hole in a random position, and to allow exit of an oriented drum having its bung hole oriented or located in a predetermined position for registry with a filling mechanism at a second or filling station. The mechanism at the locating station also includes bung locating means operable to provide relative rotation between the drum and a bung locating member, and to terminate such relative rotation when a bung hole has been oriented.

The oriented drum is then moved forwardly to the above-mentioned second, or filling station where it is first tared, i. e., its empty weight is measured. During forward movement of the oriented drum, the locating mechanism is employed to maintain the drum in proper position. Then a filling mechanism at such filling station commences a cycle of operation wherein the drum is filled with liquid until a weighing mechanism records a predetermined net weight of liquid. A means is provided for terminating the flow of liquid at this point. Preferably the filling operation is carried out in two increments, the first of which is carried out under full flow conditions (i. e., at a rapid rate of flow) and the second under throttled flow conditions (i. e., at a reduced rate of flow). Also, a means is employed to inhibit the tendency of the rapid flow of liquid from the filling mechanism, to create foam and to react against the weighing mechanism.

At the conclusion of the filling operation, by means of suitable mechanism the filling mechanism is retracted and the filled drum is moved forwardly to clear the filling station to allow entry of the next empty, oriented drum.

The three basic operations—the drum orienting operation, the weighing operation and the filling operation—are preferably carried out simultaneously or in overlapping relationship. Thus, one drum may be filling with liquid while the next drum is undergoing relative rotation to orient or locate its bung hole.

One form of the invention is illustrated by way of example in the accompanying drawings, in which:

Figure 1 is a top plan view, with certain parts broken away or shown in section, of substantially the complete apparatus or machine of the invention showing both the locating station and the weighing and filling station.

Figure 2, a section along the line 2—2 of Figure 1, is a vertical, staggered, longitudinal section through the machine of the present invention.

Figure 5 is a detailed view, partly in side elevation and partly in vertical, longitudinal section, of the bung locating mechanism, which is shown in the same stage of operation as that shown in Figure 1. The scale of Figure 5 is, however, larger than that of Figure 1.

Figures 6 and 7 are detailed views of the bung locating mechanism, taken along the lines 6—6 and 7—7, respectively, of Figure 5.

Figure 3:
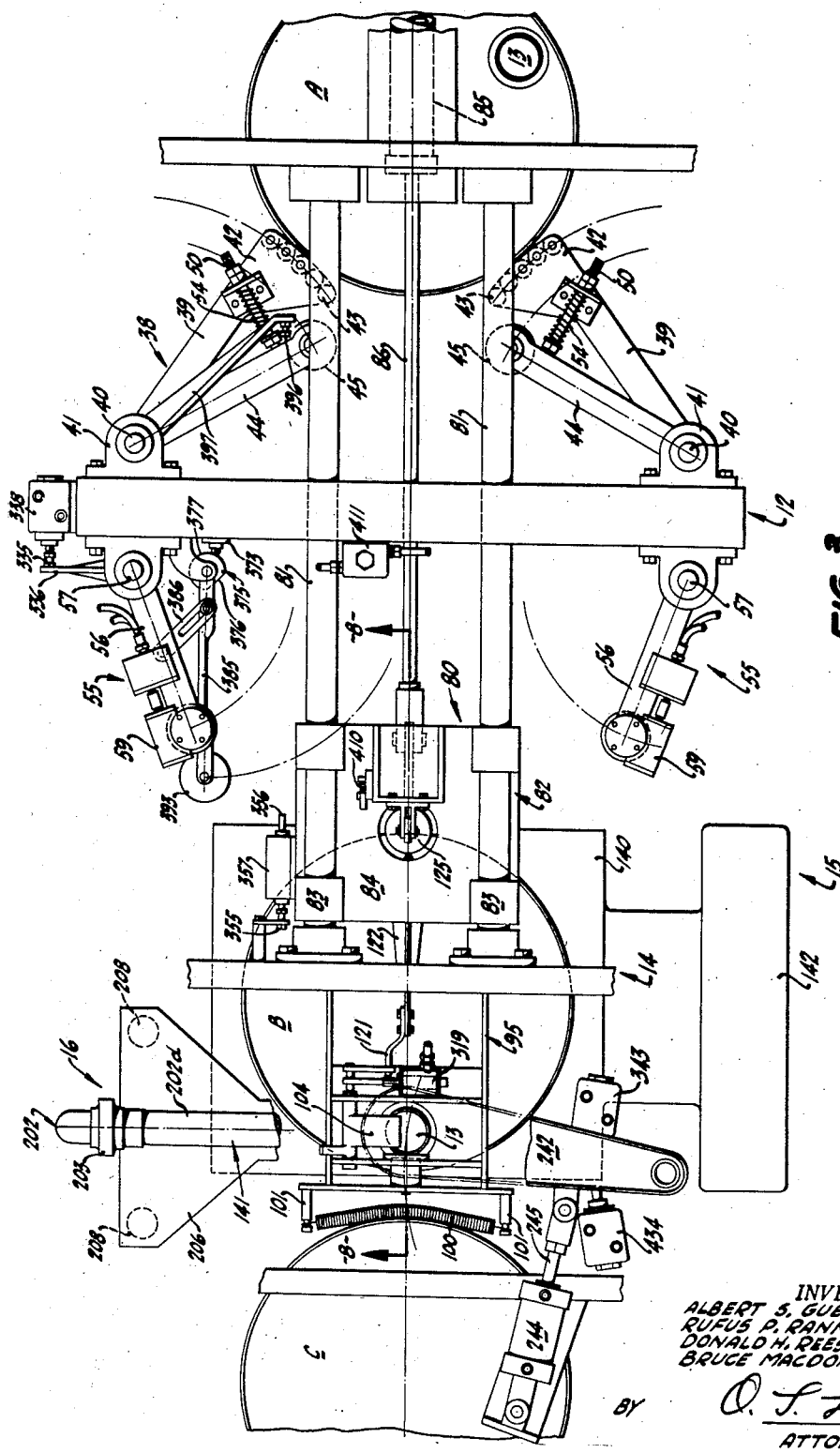
Figure 3 is a plan view similar to that of Figure 1 but with certain parts omitted for clarity and with the apparatus illustrated at a different stage of operation.

Figure 8 is a section taken along the line 8—8 of Figure 3 showing the bung locating mechanism at a different stage of operation than that shown in Figure 5.

Figure 9 is a section taken along the line 9—9 of Figure 8.

Figure 10 is a section taken along the line 10—10 of Figure 2 but on a larger scale, and it shows the gate operating mechanism for the bung locating station.

Figure 1:
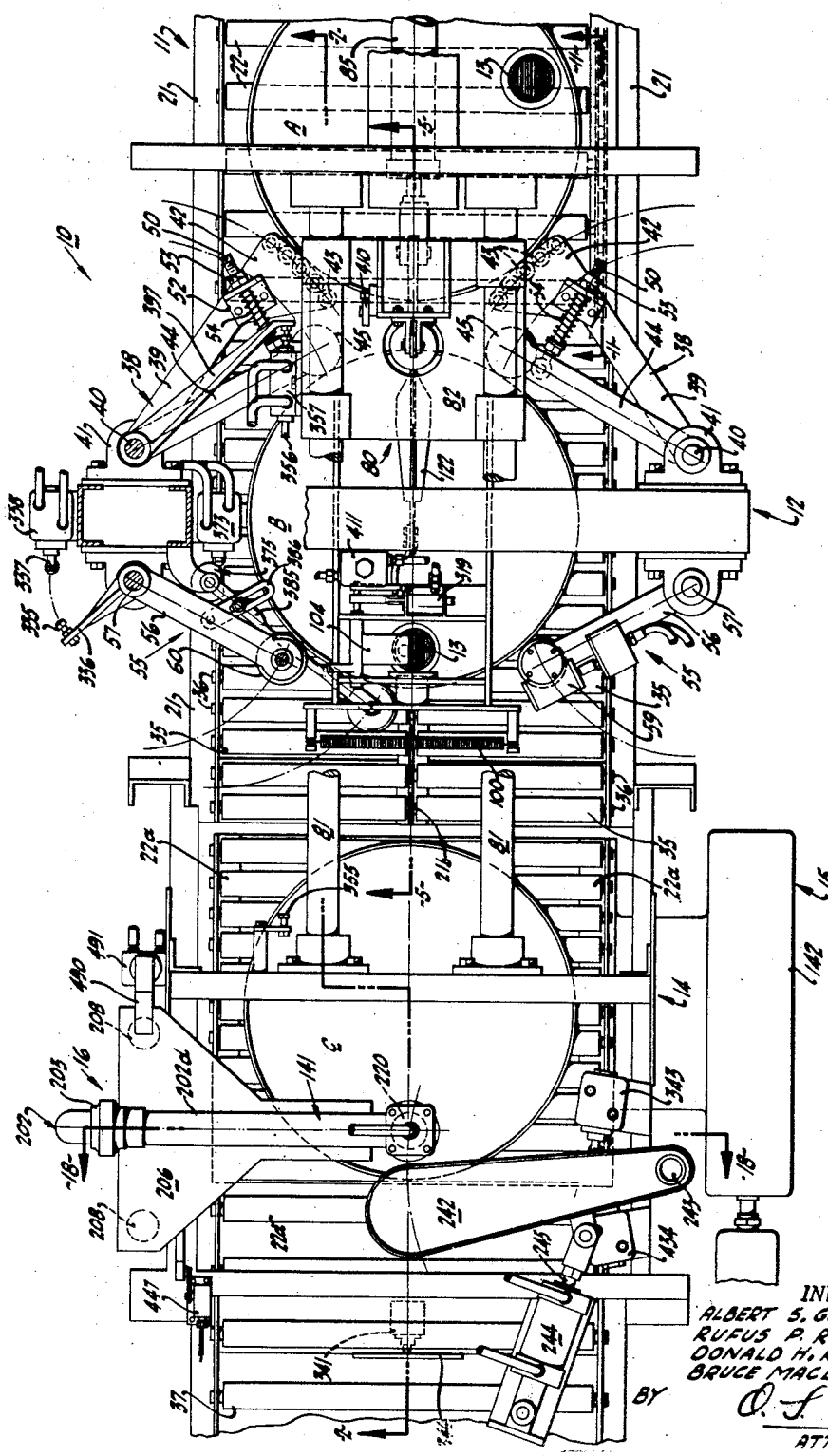

Figure 11 is a section taken along the line 11—11 of Figure 1 but on a larger scale, and it illustrates the driving means for the driven rollers employed to positively feed drums to the bung locating station.

Figure 12 is a view, partly in top plan and partly in horizontal section, of the weighing mechanism employed for taring empty drums and for weighing the liquid delivered thereto.

Figure 13 is a view in front elevation of the weighing mechanism of Figure 12, as seen from beneath Figure 12.

Figure 14 is a view generally similar to that of Figure 12 but on a larger scale and showing the weighing mechanism at a different stage of operation.

Figure 15 is a view similar to that of Figure 12 but showing the weighing mechanism at a third stage of operation.

Figure 16 is a fragmentary section taken along the line 16—16 of Figure 12.

Figure 17 is a fragmentary view, partly in front elevation and partly in section, generally similar to the view of Figure 13 but showing the weighing mechanism at a different stage of operation.

Figure 18 is a section taken along the line 18—18 of Figure 1, showing the drum filling mechanism in end elevation.

Figure 19 is a view in side elevation of the drum filling mechanism, as seen from the right of Figure 18.

Figure 20 is a detailed, fragmentary view in elevation of the midportion of the filling mechanism, which is shown at a different stage of operation than in Figure 19.

Figure 21 is a fragmentary, vertical section taken through the lance portion of the filling mechanism along the line 21—21 of Figure 19. The lance in this instance is shown in fully open position.

Figure 22 is a continuation of Figure 21, showing the lower end of the lance.

Figure 22-A is a fragmentary view, on an enlarged scale, of the lower end of the lance showing how the liquid jets from the lance impinge upon one another.

Figure 23 is a view similar to that of Figure 21 but showing the lance in partly retracted or throttled flow condition.

Figure 24 is a continuation of Figure 23, showing the lower end of the lance.

Figure 25 is a schematic drawing of a portion of the hydraulic and pneumatic control circuit of the machine illustrated in Figures 1 to 24.

Figure 26 is a continuation of Figure 25, showing the remainder of the hydraulic and pneumatic circuit and a portion of the electric control circuit.

Figure 27 is a schematic drawing of the electric control circuit of the machine illustrated in Figures 1 to 24.

THE LOCATING STATION

Referring now to the drawings and more particularly to Figure 1, the apparatus or machine of the present invention is generally designated as 10. It comprises a roller conveying system which is generally designated as 11 for transporting and supporting drums, three of which are shown and are designated as "A," "B" and "C." The machine also comprises a bung locating station generally designated as 12 for locating or orienting drums to locate their bung holes 13 at a predetermined position which is illustrated by the bung hole of the drum B in Figure 1. The machine further comprises a weighing and filling station which is generally designated as 14 and is referred to hereinafter as the filling station. At the filling station 14 each empty drum is tared (i. e., its empty weight is measured) and a predetermined quantity of oil or other liquid is delivered to the drum through its bung hole, the net weight thereof being measured by weighing apparatus generally designated as 15. The filling is accomplished by a filling mechanism 16 which is more clearly shown in Figure 2. As explained hereinafter, the apparatus 10 is equally adapted to a gross filling operation wherein drums or other vessels are filled, each to a predetermined gross weight.

Rearwardly of the locating station 12, i. e., to the right thereof as viewed in Figure 1, there is provided a set of gravity rollers 20 which are shown in Figure 11 and are suitably journaled in longitudinal frame members 21 as are other rollers hereinafter described. The end roller 20a of the set 20 is at a lower level, as illustrated, for a purpose described hereinafter. Forwardly of the gravity rollers 20, i. e., to the left as viewed in Figure 11, there is provided a set of positively driven rollers 22. These rollers are also shown in Figures 1 and 2. As is most clearly shown in Figure 11, the rollers 22 are driven by an hydraulic drum intake motor 23 connected by a resilient coupling 24 to a gear reducing unit 25, a chain 26 and cooperating sprockets 27, 28 and 29. Operation of the motor 23, hence operation of the driven rollers 22, is carried out intermittently in the manner and for the purpose described hereinafter. The offset of the end roller 20a of the inclined gravity rollers 20 has this advantage: It allows a drum to advance approximately half its diameter before it drops to the level of the rollers 22. This ensures a smooth transition of the drum to the rollers 22.

As shown in Figure 1, at the locating station 12, half rollers 35 are provided which are journaled on shafts 36 which are fixed to frame members 21 and 21b. The half rollers 35 are idlers, and the purpose of employing half rollers is to permit those on one side of the longitudinal axis of the machine to rotate clockwise while those on the other side rotate counterclockwise. By this means no torque is created to resist rotation of a drum on the half rollers 35. The rollers forwardly of the half rollers 35, i. e., to the left thereof as viewed in Figure 1, are full rollers which are idlers generally similar to the gravity rollers 20.

As illustrated in Figure 2, one pair of the half rollers, shown at 35a and located on the diameter of the drum B which is perpendicular to the longitudinal axis of the machine, is slightly raised or has a slightly greater diameter, e. g., a ⅛ inch greater diameter, than the rollers 35 on either side, the reason for this being as follows:

As explained hereinafter, the drum B is rotated to locate the bung hole 13 at a predetermined position. The lower rim or chime of a drum may have a tendency to dig in between adjacent rollers and to resist rotation. This is particularly so in the case of damaged drums. By supporting a drum on the raised or larger center rollers 35a slightly above the level of the adjacent rollers 35, this difficulty is obviated.

As shown in Figures 1 and 2 the locating station is provided at its rearward or entry end, i. e., at its right-hand end as viewed in Figures 1 and 2, with a pair of entry or drum intake gates 38 each of which comprises a pair of upper and lower arms 39 which are fixed to a vertical shaft 40 which is journaled in vertical frame members 41. Each arm fans out at 42 at its outer end, and vertical rollers 43 are journaled in these end portions 42. As illustrated in Figure 1, and as is more clearly shown in Figure 2, the entry gates 38 are associated with arms 44 which are journaled on the shaft 40 so as to be supported thereby but free to rotate relatively thereto. Each pair of arms 44 rotatably support, at their outer ends, a vertical roller 45, the upper rollers 45 being of greater length than the lower rollers 45. The rollers 45 are constructed of rubber or other suitable material adapted to provide a cushioned, rotating engagement with a drum such as that shown at B. A resilient operating connection is provided between the arms 44 and the gates 38, by means of bolts 50 each of which is rotatably fixed at one end, as at 51, to a pair of the arms 44 and at its other end extends slidably through a bracket 52. The outer end of each bolt 50 is threaded to receive nuts 53, and an expansion spring 54 is provided to exert a resilient pressure on the arms 44, hence a resilient pressure of the rollers 45 on a drum such as shown at B.

At its forward end, or to the left of the locating station as viewed in Figures 1 and 2, a pair of exit gates 55 are provided, each of which is in the form of a pair of arms 56 fixed to a vertical shaft 57 which is journaled in the framework of the machine. Each gate 55 also comprises a vertical shaft 58 which is journaled in the outer ends of the arms 56, each of which is driven by an hydraulic, drum rotating motor 59. Fixed to each end of each shaft 58 is a frictional driving roller 60. The driving rollers 60 are similar in structure and size to the rollers 45.

Referring now to Figures 2 and 10, a mechanism is there illustrated for operating the gates 38 and 55. For the purpose of operating the entry gates 38 an hydraulic cylinder 61 is provided which is fixed to the framework of the machine and has a rod 61a rotatably connected at 61b to links 62 which are rotatably connected to levers 63 which are fixed to the vertical shafts 40 to rotate the same in clockwise or counterclockwise direction according to the direction of movement of the rod 61a. A similar operating means is provided for the exit gates 55, comprising an hydraulic cylinder 64 fixed to the framework of the machine and having a rod 65. The rod 65 is rotatably connected at 66 to links 67 which are rotatably connected to levers 68 fixed to the shafts 58. The rods 61a and 65 are slidably supported by bushings 69 carried by the framework of the machine.

Referring now to Figure 2, and to Figures 5 to 9, inclusive, a bung locating and drum shifting mechanism is there illustrated which is generally designated as 80 and is referred to hereinafter as the locating mechanism. The locating mechanism is slidably supported on horizontal, longitudinal, parallel rods 81 by a slide or carriage 82. The carriage 82 comprises sleeves 83 which are slidable on the rods 81 and a cross plate 84 connecting the sleeves on opposite sides. The carriage 82 is actuated by means of an hydraulic cylinder 85 (see Figures 1 and 5) having a rod 86 which is rotatably connected at 87 to a bracket 88 fixed to the carriage 82.

The locating mechanism 80 comprises a rectangular frame 95 which is pivotally supported on a shaft 96 carried by brackets 97. A spring 98 is fixed at one end to the cross plate 84 of carriage 82 and at its other end to a cross piece 99 carried by the frame 95. The springs 98 serve to counterbalance the weight of the frame and its attachments. At the forward end of the frame 95, i. e., to the left as viewed in Figure 5, a spring 100 is provided which is fixed to pins 101 and which has a purpose explained hereinafter. The spring 100 is most clearly shown in Figure 1.

A roller 102 is provided which is journaled in the outer end of the frame 95 in such position as to rest and roll on the rim or chime 103 of a drum. In such position as to register with the bung hole 13 and its rim 13a of the drum, there is also provided an arm 104 (which is shown in plain view in Figure 1), one end of which (the right-hand end as viewed in Figures 6 and 7) is fixed to a shaft 105 which is rotatable in brackets 106 carried by the frame 95. Fixed to the left-hand end of the arm 104 as viewed in Figure 6 is a bung locating finger 107 which is intended to drop into the bung hole 13 as illustrated in Figures 6 and 7. Fixed to the other end of the arm 104 is a stop member 108. The shaft 105 also carries a cam 109 having a low dwell 110 and a high dwell 112. The cam 109 is intended to operate a valve 319 which is described hereinafter in connection with the control system for the machine. Means is provided for positively rotating the shaft 105 in connection with the control elements of the machine, such means comprising a finger 120 which is fixed to the shaft 105 and is engageable with a finger 121 on a bell crank lever 122 which is journaled on the shaft 96. At its rearward or right-hand end, the bell crank lever 122 is pivotally connected by a slot 123 and pin 123a to the rod 124 of an air cylinder 125.

The operation of the machine as thus far described, and without reference to the control system for timing the various operations, is as follows:

Referring first to Figure 1, a drum B is assumed to be in the position shown at the bung locating station 12 but with its bung hole 13 at a random location. It will be apparent, of course, that as drums are fed to the locating station 12, their bung holes will be located at random at any point on a 360° arc. One purpose of the bung locating mechanism 80 is to rotate each drum until its bung hole 13 is at a predetermined position. The gates 38 and 55 are assumed to be closed and a drum A to be awaiting its turn adjacent the locating station. Also an oriented drum C (i. e., a drum having its bung hole in the proper position) is assumed to be located at the filling station 14 being filled with liquid. As soon as the gates 38 and 55 are closed, the driving rollers 60 (see Figure 2) are in firm contact with the forward sides of the drum on opposite sides of the longitudinal axis of the machine. The rearward rollers 45 are pressed resiliently against the rearward sides of the drum by the expansion springs 54. There is an important advantage in this resilient contact between the rearward rollers 45 and the drum, as follows:

To provide a rapid, dependable friction drive for the drums, it is important that the friction rollers 45 and 60 be in firm, intimate contact with the sides of the drum. However, drums vary somewhat in diameter, and a damaged drum may have an irregular surface. Accordingly, it is disadvantageous to have the rollers 45 and 60 spaced a predetermined distance apart. If they are spaced too closely they will not accommodate oversized drums and if they are spaced too distantly they will not provide an adequate drive for rotating an undersized drum. The pivotal mounting of the rearward rollers 45 and the resilient pressure urging them against the drum insures adequate pressure of the rollers on the drum at all times and allows for variations in diameter of the drum. Also, this resilient pressure will allow the rearward rollers 45 to move forwardly and rearwardly in conformity to irregularities in the sides of a drum.

The hydraulic drum rotating motors 59 now commence operation, causing rotation of the forward rollers 60 which in turn cause rotation of the drum. Meanwhile, as illustrated in Figures 5, 6 and 7, the guide roller 102 of the bung locating mechanism 80 will roll freely on the chime 103 of the drum and the bung locating finger 107, which is free to drop by gravity, will ride on the top of the drum until it strikes the rim 13a of the bung hole 13. Since the shaft 105 is free in its bearings, the finger 107 will then ride up the side of the rim 13a, and, when it clears the rim, will drop instantly into the bung hole. As will be seen from an inspection of Figure 7, the stop member 108 has an advantageous function in that it will strike a frame member 106a forming a part of the locating mechanism 80 and will thereby stop further clockwise movement of the finger 107. This constitutes a safety feature and is of importance because rapid operation (for which the machine is intended) causes the drum to rotate rapidly. Under these conditions the fingers 107 and its arm 104 may have a tendency, when the finger 107 strikes the rim 13a, to bounce rapidly upwardly and to return by gravity after the finger 107 has cleared the opposite side of the bung hole 13. Such operation, of course, would be undesirable and would prevent proper functioning of the bung locating mechanism.

When the bung locating finger 107 has dropped into the bung hole 13 the cam 109 will have been rotated to the position shown in Figure 6 wherein it will actuate the valve 319 to initiate a phase of operation of the control system in the manner described hereinafter, such operation resulting in the following sequence of events.

Referring to Figure 3, the exit gates 55 will open, the entry gates 38 meanwhile remaining closed. The hydraulic cylinder 85 will then operate to cause the carriage 82 to move forwardly to the position shown in Figure 3. Meanwhile the frame 95 will remain in the down position illustrated in Figure 5 and, by reason of the continued presence of the locating finger 107 in the bung hole 13, the forward stroke of the carriage 82 will cause forward movement of the drum B to the filling station 14. Also, the locating finger 107 will prevent rotation of the drum as it is moved forwardly, due to unequal friction on opposite sides of the drum. The drum B will, therefore, be deposited by the locating mechanism 80 at the end of its forward stroke, in precisely the position required for the filling operation. The spring 100 at the forward end of the frame 95 serves to push the drum C (which will have been filled) forwardly and clear of the filling station 14.

At the end of the forward stroke of the locating mechanism 80, the frame lifting cylinder 125 will operate to rock the bell crank lever 122 clockwise as viewed in Figures 5 and 8. The first increment of this movement removes the bung locating finger 107 from the bung hole and it also produces an effect on the control system, as explained hereinafter. During its second increment of clockwise movement the rearward end of bell crank lever 122 contacts the rear end 95a of frame 95 thereby causing the latter to rock in clockwise direction to the tilted or up position shown in Figure 8.

As mentioned above, the locating mechanism 80 also functions to push a filled drum from the filling station 14. A bung may then be inserted in the bung hole 13, either manually or by automatic means.

The oriented but as yet empty drum B will, by this time, have been deposited in position at the filling station 14 with its bung hole 13 in proper position for the filling operation. Operation of the hydraulic cylinder 85 is now reversed, causing the carriage 82 to commence its return stroke. During this return stroke the exit gates 55 of the locating station 12 are closed and the entry gates 38 are opened to assume the repective positions shown in Figure 4. When the gates 38 and 55 are in this condition the hydraulic intake motor 23 (see Figure 11) commences its operation to drive the rollers 22, thereby advancing the next drum A into the locating station 12. Thereafter, the gates 38 are closed, the frame 95 is lowered and one complete cycle of the operation of the locating station is terminated. It will be understood, of course, that this cycle is repeated indefinitely.

THE WEIGHING AND FILLING STATION

Referring now to Figures 1 and 2, the drum C at the filling station 14 is supported by rollers 22a which are fixed to the platform 140 of the weighing apparatus 15. A lance 141, shown in Figure 2, is provided and is there shown as extending into the drum C through its bung hole 13 so that its lower end is close to the bottom of the drum. The drum is first weighed empty or tared. Then the lance 141 enters the drum, the filling operation commences and the weight of the added liquid is registered by the weighing apparatus 15. During the filling operation, when a predetermined weight of liquid has been delivered to the drum, somewhat less than the total quantity of liquid which it is desired to deliver, the lance mechanism 141 is partially closed in the manner described hereinafter to throttle the flow of liquid. When the final quantity of liquid has been delivered to the drum the lance is closed completely and is withdrawn from the drum.

For the purpose of taring the drums and weighing the liquid added, any of several known types of weighing apparatus may be used. One such apparatus is shown in detail in Figures 12 to 17 and is generally designated as 15. Referring to Figure 1, the housing 142 for such weighing apparatus is shown in top plan. Within the housing 142 there is provided a mechanism which is illustrated in Figures 12 to 17 for effecting the taring and net weighing operations. As will be seen in Figure 12, a torque shaft 143a is provided which is enclosed in a housing 143 and is rotated by a load on the platform 140 through the medium of a rack 144 which is attached to the platform and a pinion 145 which is fixed to the torque shaft 143a.

Referring now more particularly to Figures 12 and 13 to 15, in Figure 12, a gross hand or tare hand 146 is fixed to an inner or male clutch element 147 which, in turn, is fixed to the torque shaft 143a and which is cooperable with an axially shiftable female clutch element 148 to which a net hand 149 is fixed. The clutch element 147 is fixed to the torque shaft 143a by means of set screws 150, which means permits adjustment of the hands 146 and 149 relatively to one another and to the torque shaft.

The female clutch element 148 is integral with a plate 151 having holes 152 formed therein for reception of dowel pins 153 which are slidable in holes 154a formed in a frame member 154. A slide block or plunger 155 is provided to which the dowel pins 153 are fixed and which is slidable on a bushing 156. A neck or connecting portion 157 provides a rigid connection between the female clutch element 148 and the plate 151, as is most clearly shown in Figures 14 and 16. The neck portion is provided with holes 157a to receive steel balls 158, and a garter spring 158a is provided which embraces the steel balls. A sleeve 159 fixed to the outer end of the torque shaft 143a is formed with a taper at 159a to cooperate with the spring 158a in the manner described hereinafter.

It is intended that the weighing mechanism thus far described go through the following sequence of operation:

The gross or tare hand 146 is at all times locked to the torque shaft 143a. Hence, as soon as an empty drum, such as that shown at C in Figure 1, is deposited on the platform 140, the gross hand 146 will register the weight of the empty drum; i. e., it will tare the drum. At this instant both the slide block 155 and plate 151 are in the retracted position shown in Figure 15. Hence, the female clutch element 148 is disengaged from the male clutch element 147 and, as a result, the net hand 149 will not move with the gross hand 146. Also, the net hand 149 is meanwhile locked at its zero position on the scale of the weighing apparatus by a means hereinafter described. After an empty drum has been delivered and tared, the slide block 155, its dowel pins 153, the plate 151 and the female clutch element 148 are moved outwardly as a unit to the position shown in Figure 14. Then the clutch element 148 is latched in the position shown and the block 155 and dowel pins 153 are retracted to the position shown in Figure 12. The filling operation now commences and the net hand 149 registers the net weight of liquid delivered to the drum.

The mechanism for accomplishing certain of these operations will now be described: Inner and outer yokes 160 and 161, respectively, are pivoted on a pin 162 which is carried by the frame 154. Both of these yokes are biased in clockwise direction as viewed in Figure 12, by expansion springs 163 and 164, respectively, which are shown in Figures 12 and 13. At the left-hand end of the inner yoke 160, as viewed in Figure 12, pins 165 are provided which are more clearly shown in Figure 16. As there shown, the pins 165 are received in slots 166 formed in the slide block 155. Also a leaf spring 167 is provided for each of the slots 166, each such spring being fixed at 167a to the inner yoke 160 and bearing at its left-hand end, as viewed in Figure 14, against the outer side of a slot 166 to urge the block 155 resiliently outwardly, i. e., toward the male clutch element 147.

The outer yoke 161 is provided at its left-hand end, as viewed in Figures 12 and 13, with a latch means 168. As is most clearly shown in Figure 14, an insert 169 is fixed to the outer end of the yoke 161 by means of a screw 170 which extends through a wide slot 170a, by which means the insert 169 can be adjusted inwardly and outwardly to adjust the relation of its beveled corner 171 to the cooperating beveled corner 172 of a latch block 173. The latch block 173 is pivotally mounted at 174 on the frame 154 and it is urged outwardly or to the left as viewed in Figure 14, by an expansion spring 175 seated in a socket 175a formed in the frame member 154. The engagement of the beveled corners 171 and 172 is such that the more powerful springs 164 (which are shown in Figure 13) will overcome the counteracting force of the spring 175 and, unless it is otherwise restrained, the latch block 173 will pivot counterclockwise to allow the outer yoke 161 to pivot clockwise as viewed in Figure 14.

A latch finger 177 is provided which is pivoted on a stud 178 which is threaded into the frame member 154. The latch finger 177 is urged in counterclockwise direction, as viewed in Figure 13, by an expansion spring 179 so as normally to lie in the path of the latch block 173. The latch block 173 and latch finger 177 are formed with cooperable notches 173a (which is best shown in Figure 14) and 177b (which is best shown in Figure 13), respectively, whereby, when the outer yoke 161 is rocked to the position shown in Figure 14, the latch finger 177 will hold the beveled corners 171 and 172 in engagement and will latch the outer yoke 161 in the position shown in Figure 14.

The outer yoke 161 is provided with pins 185 which are shown in Figures 13 and 16 and are seated in slots 186 formed in the plate 151 which is integral with the female clutch member 148. Referring to Figure 14, an operating means for the yokes 160 and 161 is provided in the form of a plunger or piston 187 which is slidable in a cylinder 188 formed in the frame member 154. The cylinder 188 is supplied with fluid pressure through a passage 189. A rod 190 has a socketed outer end which bears against a steel ball 191 seated in a socket 192 formed in a cross member 193 which is fixed to the inner yoke 160.

The operation of the weighing mechanism thus described and apart from the control system, is as follows: As explained above, while an empty drum is being tared by the gross hand 146, the slide block 155, the dowel pins 153 and the plate 151 are all in the retracted position shown in Figure 15. When the drum has been tared, a short pulse of fluid pressure is delivered through the passage 189 to the cylinder 188 to drive the piston 187 outwardly, hence to rock the inner yoke 160 counterclockwise as viewed in Figure 14. This rocking movement carries the slide block 155 outwardly, and with it the dowel pins 153, the plate 151 and the female clutch element 148, to the position shown in Figure 14 through the medium of the leaf springs 167 and pins 165. As the garter spring 158a and steel balls 158 slide or roll down the tapered surface 159a, the spring will contract and snap the plate 151 to the position shown in Figure 14 with a very rapid action. During this portion of the weighing cycle, engagement of the pins 185 (see Figure 16) with the plate 151 will cause movement of the outer yoke 161 with the inner yoke 160. Operation of the latch means 168 will latch the outer yoke in the position shown in Figure 14; i. e., it will lock the clutch elements 147 and 148 together so that henceforward the gross hand 146 and net hand 149 must move together.

Since only a short pulse of pressure is delivered to the cylinder 188, the piston 187 is free to return, and it does return in response to the expansive force of the springs 163. The slide block 155 and dowel pins 153 therefore return to the retracted position shown in Figure 12. The net hand 149 is now not only locked to the gross hand 146 but is free to rotate therewith as liquid is delivered to the drum.

At the conclusion of the filling operation and when the filled drum is moved from the platform 140, the clutch elements 147 and 148 will rotate back to their zero positions. A finger 196 on the plate 151 will strike the right-hand end of the latch finger 177 as viewed in Figure 14, and will pivot it to release the latch block 173. As a consequence the outer yoke 161 is unlatched and is free to return, and it does return under the urging of the springs 164. This completes a cycle in the weighing operation.

Referring now to Figures 18 to 24, the filling apparatus is there shown and is designated generally as 16. It comprises a lance mechanism 141 which is supplied with oil or other liquid to be delivered to drums by jointed piping 202 which consists of lengths of pipe 202a, 202b, 202c and 202d connected together by swivel joints 203 to allow relative movement as indicated in Figure 19. The lance 141 is provided with means for moving it vertically comprising an hydraulic lifting cylinder 204 (see Figure 18) having an adjustable rod 204a connected to a bracket 206 which is bolted to the piping 202. The cylinder 204 is suitably clamped to the frame 207 of the filling apparatus, and guide rods 207a and bushings 207b are provided to insure accurate, vertical movement of the lance 141. Referring more particularly to Figures 21 to 24, the lance 141 comprises an outer tube 208 having a tapered opening 209 at its lower end, and an inner tube 210 which is slidable in the outer tube. The inner tube is open at its upper end and is closed at its lower end by a conical tip 215, and it is provided adjacent the tip 215 with an O-ring 216 seated in an annular groove 217. The lower half of the inner tube 210 is formed with slots 218. As is shown more clearly in Figure 22, the slots 218 are slanted to provide pairs of converging slots for a purpose which is described hereinafter.

The lance 141 also comprises an upper portion including a sealing cylinder 219 and an operating cylinder 220. A rod 221 is threaded at its lower end to the tip 215 and at its upper end to a sealing piston 222 which is slidable in the sealing cylinder 219. A drain hole 223 is provided at the upper end of the cylinder 219. A rod 224 is connected to the upper end of the sealing piston 222 and is slidable through a passage 225 formed in a gland 226. At its upper end, the rod 224 is connected to an operating piston 227 which is slidable in the operating cylinder 220. The rod 224 has an extension 235 above the piston 227 having a tapered upper end 236, and it is provided adjacent this tapered end with an O-ring 237 which is seated in an annular groove 238. The operating cylinder 220 is formed with a bottom port 239 at its lower end and with a top port 240 and a side port 241 at its upper end.

A further feature of the filling mechanism 200 is a drip pan 242 which is shown in top plan view in Figure 1. As shown in Figure 18, the drip pan 242 is rotatably mounted at the upper end of a drain pipe 243 and as shown in Figure 1, the drip pan 242 is rotated about the axis of pipe 243 by means of an hydraulic cylinder 244 and a rod 245 rotatably connected to the drip pan.

The operation of the filling mechanism 200, apart from the control system, is as follows: While a drum is being pushed into position at the filling station 14 in the manner described hereinabove, the lance 141 will be in the up or retracted position indicated by the broken lines in Figure 19, i. e., with its tip 215 above the top and chime of the drum. Also, the inner tube 210 will be in its completely retracted position with the O-ring 216 in sealing engagement with the lower end of the outer tube 208. Also the drip pan 242 will be in the position shown in Figure 4; i. e., underneath the lance 141 to catch drippings.

Figure 4:
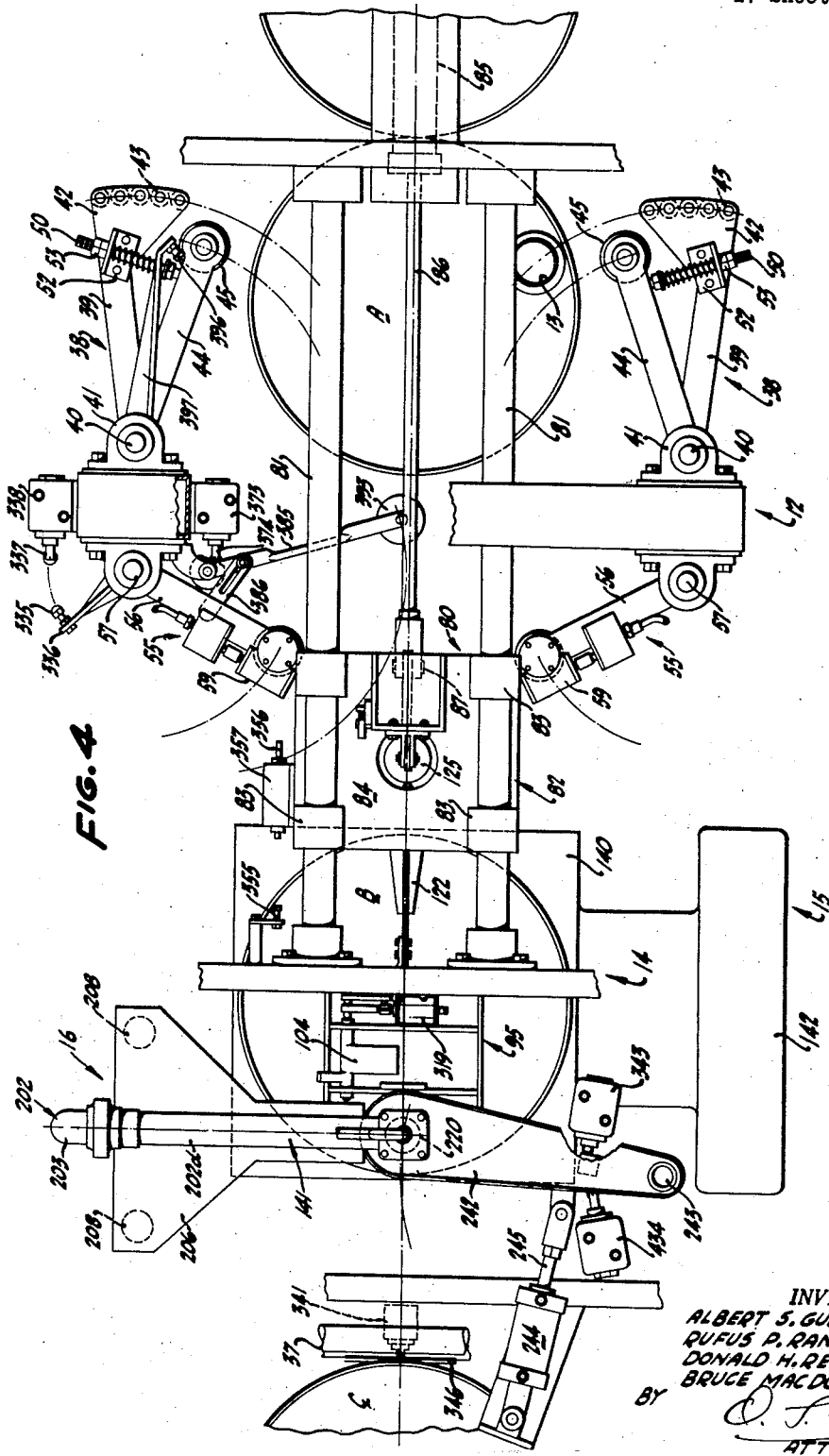
Figure 4 is a view similar to that of Figure 3 but showing the machine at a third stage of operation.

The drip pan is then rotated to the left as viewed in Figures 1 and 4, to assume the position shown in Figure 1. Then the lance 141 is lowered into the drum through its bung hole 13 to a point near the bottom of the drum. This is accomplished by release of pressure in the lance lifting cylinder 204 to allow the lance to drop by gravity. Hydraulic fluid under pressure is introduced through the top port 240 of the lance operating cylinder 220 to force the inner tube 210 downwardly to its fully open position illustrated in Figure 22. Lubricating oil, gasoline, kerosene or any other liquid which it is desired to supply to the drum, enters the lance through the piping 202 and flows outwardly through the slots 218 into the drum. A suitable source of liquid is provided. Preferably a constant displacement pump (not shown) is employed for this purpose to deliver liquid at a constant volume rate.

As shown in Figure 22A, the streams or jets 249 of liquid issuing from the slots 218 converge in pairs. The significance of this feature is as follows: The machine of the present invention, including the filling mechanism 200, is intended to operate at high speed, e. g., to orient and fill a 55 gallon drum each thirty seconds. The diameter of the lance 141 is limited by the diameter of the bung holes. Also, to limit foaming of the liquid as it is delivered to a drum, it is desirable to introduce the liquid near the bottom of the drum, as indicated in Figures 18 and 19. These factors—a high filling speed (about fifteen seconds for a 55 gallon drum), limited diameter of the lance and delivery of liquid only at the bottom of a drum—give rise to certain problems. The limitations of lance diameter and height of the slotted area gives rise, at high filling rates, to jets of very high speed. These high speed jets tend to create foam and to react against the scale platform 140. Foaming is undesirable because of inaccurate filling; excessive foaming will cause a drum to overflow before the proper weight of liquid has been delivered, and reaction against the scale will give rise to inaccurate weighing.

To obviate these difficulties, the outlet orifices are preferably arranged as illustrated in Figure 22, i. e., in pairs of converging slots. The resulting convergence of the jets 249 of liquid instantly dissipates the kinetic energy of the liquid while it is still in the immediate vicinity of the lance. Foaming and reaction against the scale are, therefore, minimized. Also, the arrangement of the slots 218 about the periphery of the inner tube 210 assists in minimizing the above-mentioned reaction.

In the design of the slots 218 a certain degree of trial and error in the light of several factors will suffice to provide an optimum design for given conditions. These factors are the desired filling rate, the diameter of the bung holes, the height of the drums and the viscosity and density of the liquid. Thus, the number, size and angle of the slots 218 will be selected, under given conditions and in the light of these factors, to provide optimum filling. A higher filling rate makes it desirable to employ a greater slot area which, however, is limited by the bung hole diameter (which limits the lance diameter) and by the drum height (which governs the optimum height of the slotted area). A more viscous liquid requires a greater slot area or a greater filling pressure.

In general, the slot design is such as to dissipate kinetic energy of the liquid after it issues from the lance but immediately adjacent the lance; to carry out the great bulk of filling while the slotted area is submerged in a body of liquid; and to direct the issuing jets radially of and about the periphery of the lance.

Another feature of the filling mechanism 200 is the provision of means for throttling the flow of liquid just prior to the instant when the final, predetermined weight of liquid has been delivered to a drum. This feature will now be described. As explained above, each empty drum is tared by the weighing mechanism, including the gross hand 146, and thereafter the net hand 149 is locked to the gross hand and rotates with it as the drum is filled with liquid. Meanwhile the lance 141 is in the fully open position shown in Figure 22, to allow filling at the maximum rate. Slightly before the predetermined final weight of liquid is delivered to the drum, e. g., when the net weight is approximately ten pounds short of the final weight of, say, fifty two gallons of liquid, the inner tube 210 is partially retracted so that it occupies the throttled position illustrated in Figure 24. This has the effect of throttling without stopping the flow of liquid, which is a matter of importance under conditions of rapid operation. Thus, the machine of the present invention is designed to rotate a fifty-five gallon drum for orientation of its bung hole, deliver the oriented drum to the filling station, tare the empty drum, fill it and deliver it in condition for capping, all in a period of less than 30 seconds. The actual filling operation is completed in about 15 seconds. Under these conditions of rapid operation there is necessarily some delay or lag in operation of the control system and/or of the mechanical elements controlled thereby. If, under these conditions, the full rate of flow is maintained until the last increment of liquid has been delivered, such lag may give rise to inaccurate filling. In accordance with our invention this difficulty is obviated by throttling the flow of liquid shortly before the predetermined final weight of liquid has been delivered.

This throttling action is actuated by means of the control system described hereinafter, in conjunction with the ports 240 and 241 of the operating cylinder 220, the tapered rod extension 235 and its O-ring 237. Briefly, a signal is initiated by the weighing mechanism when a predetermined net weight is recorded, such weight being short of the final weight. This signal causes flow of the hydraulic fluid under pressure through the bottom port 239 of the operating cylinder 220 to move the operating piston 227 upwardly to the position shown in Figure 23. During this increment of movement of the piston 227, a valve hereinafter described, which controls flow of fluid through the side port 241, remains closed, thereby preventing flow of liquid through that port. Fluid is free to flow through the top port 240 until the tapered end 236 of the rod extension 235 enters the top port 240 and the O-ring 237 enters the port 240 and seals against its walls, thereby preventing further flow of fluid therefrom. This condition prevails until a further signal from the weighing mechanism at the instant when the final predetermined weight of liquid has been recorded by the net hand 149. At this instant the valve controlling the flow of liquid from the side port 241 opens. Liquid is then free to drain through that port, and the rod extension 235 is pushed further into the top port 240 until the piston 227 reaches the end of its stroke. The O-ring 237 compresses somewhat as it passes farther into the port 240. Under these conditions the piston 227 will be driven to the limit of its up stroke and the inner tube 210 of the lance 141 will be completely closed. The O-ring 216 will seal against the inner walls of the outer tube 208 and further flow from the lance will be completely terminated.

At this time the hydraulic cylinder 204 will be operated to raise the lance 141 until it is clear of the drum, and the hydraulic cylinder 244 will be operated to rotate the drip pan 242 clockwise as viewed in Figure 1 into a position beneath and in registry with the lance, where it will catch drippings from the lance. These drippings drain through the pipe 243 to a sump where they may be reclaimed if desired. Thereafter, and prior to commencement of the next filling cycle, the hydraulic cylinder 244 will reverse to rotate the drip pan counterclockwise so as to clear the lance. Also, the next forward stroke of the locating mechanism 80 will push the filled drum forwardly out of the filling station 14. This completes one cycle of the filling operation. This cycle is, of course, repeated indefinitely.

HYDRAULIC AND PNEUMATIC CONTROL SYSTEM

It will be apparent that a control system is required for proper functioning of the machine thus described, to synchronize the various parts thereof. Such control system is illustrated in Figures 25, 26 and 27 of the drawings and it comprises certain hydraulic, pneumatic and electrical elements, which will be described first with reference primarily to the hydraulic and pneumatic controls.

The machine is assumed to be in the stage of operation shown in Figure 1; i. e., a drum A is awaiting its turn at the locating station 12, a drum B is at the locating station 12 but with its bung hole 13 in a random position; the gates 38 and 55 are closed; a drum C is at the filling station 14 being filled with liquid; and the drip pan 242 has been pivoted clear of the lance 141.

The control system and its operation will first be described in connection with a complete cycle of operation of the locating station 12.

The locating station

Referring now to Figure 25, hydraulic pressure is provided at a source 300 which includes a motor 301 and pumps 302 and 303 for supplying a relatively high pressure (e. g., 500 lbs. per square inch) and a relatively low pressure (e. g., 300 lbs. per square inch). Main supply lines 304 and 305 lead from these pumps as illustrated.

Among the several control valves of the system are valves 306 and 307. The valves 306 and 307 and other similar valves in the system are of known construction and operation and include appropriate fluid passages, one or more pilots, which may be air operated (air pilots) or hydraulically operated (hydraulic pilots) and appropriate lands for selectively opening, closing and intercommunicating the various passages. In some cases the valves are spring loaded and each such valve embodies a spring which urges the valve to a normal or "spring" position and which is opposed from time to time by a cam or a pilot which changes the valve to a "cam" or "pilot" position. The valves 306 and 307 are typical valves. Thus the valve 306 has hydraulic pilots 306A and 306B to cause the valve to assume either of two positions designated as hydraulic pilot A and hydraulic pilot B positions, respectively, or simply pilot A and pilot B positions, respectively. The valve 307 is shown as having a spring 307B which normally urges the valve to what shall be referred to hereinafter as the "spring" position, and an air pilot 307A which urges the valve in opposition to the spring to what shall be referred to hereinafter as the hydraulic pilot A, or pilot A position.

Fluid pressure flows as follows: At the stage of operation which has been assumed, i. e., at the stage shown in Figure 1, hydraulic pressure passes through the main pressure line 304 and a branch 308 to the valve 306. The latter is in the pilot A position and fluid flows from the line 308 through the valve 306 to a line 309, thence to the hydraulic drum rotating motors 59 (see also Figures 1 and 2) which drive the rollers 60. These rollers rotate the drum B to locate its bung hole 13. Fluid flows from the motors 59 through a line 309A to a sump. Sump lines are uniformly represented in Figures 25 and 26 by the same type of symbol, i. e., by a short line terminating in an arrow. Their further description is omitted as unnecessary.

Meanwhile, hydraulic fluid also passes from the main line 304 through a branch line 310 to the valve 307, which is in the spring position. In this position the valve 307 connects the branch line 310 with a line 315 to communicate pressure to one end of the cylinder 64 which operates the exit gates 55 (see Figure 1). Pressure is so delivered to the cylinder 64 as to maintain the gates 55 in closed position. Since the cylinder 64 is a double acting cylinder, it is, of course, necessary to bleed fluid from the other side of the piston, which in this instance is through a line 324 to the valve 307, thence to sump. Similarly, in the case of other fluid pressure operated cylinders described hereinafter, a suitable bleed is accomplished in response to movement of a piston. Such bleed will be apparent from Figures 25 and 26 and the description herein. Hence mention thereof will be omitted as unnecessary.

Fluid also flows through the main line 304 and a branch line 316 to a valve 317 which is in the pilot A position. In such position the valve 317 communicates pressure from the line 316 to a line 318, thence to one end of the cylinder 61 (see Figure 11) to maintain the entry gates 38 in closed position.

Meanwhile, as the drum B rotates, the roller 102 of the locating mechanism 80 will roll on the chime of the drum and the bung locating finger 107 will ride on the top of the drum (see Figures 5, 6 and 7). An air signal valve 319 is carried by the frame 95 of the bung locating mechanism adjacent the cam 109 (see Figure 6), and as long as the bung locating finger 107 rides on the top of the drum, a roller 320 on a lever 321 remains in engagement with the low dwell 110 of the cam 109. As long as this condition exists, the signal valve 319 remains in its spring position and is closed. However, when the locating finger 107 drops into a bung hole 13, the cam is rotated counterclockwise as viewed in Figures 6 and 25 and the roller 320 rides up the rise of the cam 109 to the high dwell 112. The roller 320 engages the rod of valve 319 and when the roller also engages the high dwell 112 of cam 109, it causes the valve 319 to assume its cam or open position. An air signal from a suitable source of compressed air (e. g., a 10 to 100 p. s. i. source), passes through a line 322, thence through the valve 319 and a line 323 to the air pilot 307A of the valve 307. The latter is thereby changed to its pilot A position and hydraulic pressure is communicated from the branch line 310 through a line 324 to the opposite end of the cylinder 64 to open the exit gates 55. Also, fluid pressure is communicated through a branch line 325 to the hydraulic pilot 306B of valve 306, which changes the position of that valve so as to shut off flow of fluid to the hydraulic motors 59, thereby stopping operation of the hydraulic motors 59 and of the drum rotating rollers 60. The drum therefore comes to a halt, and any tendency thereof to continue rotation due to inertia is prevented by the presence of the bung locating finger 107 in the bung hole 13.

Referring now to Figure 3, it will be seen that as the exit gates 55 open, an adjustable stud 335 on an arm 336 which is fixed to one of the gates 55, will contact the rod 337 of a spring loaded valve 338, thereby placing that valve in its cam position. Referring to Figure 25, pressure is thereby communicated from the main line 304 and a branch line 339 through the valve 338 to a line 340, thence to a valve 341. It is assumed that valve 341 is in its spring position (this feature of the system being explained hereinafter). Accordingly, pressure is communicated from the line 340 through the valve 341 to a line 342, thence to a valve 343. It is assumed that the valve 343 is in its cam position, as explained in detail hereinafter. Accordingly, pressure is communicated from the line 342 through the valve 343 to a line 344, thence to a hand valve 345. Assuming that the latter is open, as it will be during normal operation of the machine, pressure is communicated from the line 344 through the valve 345 to a line 346. The valves 341 and 343 provide interlocks with the filling mechanism and they function as follows:

Referring to Figure 1, the valve 341 is there shown at the left of the filling station 14. It is a spring loaded, normally open valve but if a drum is located at the left of and immediately adjacent the filling station, a cam lever 346 will be depressed by the drum to operate a cam. The valve 341 is thereby placed in its cam or closed position. Hence, passage of pressure from the main pressure line 339 to the line 346 is stopped by the valve 341. This makes certain that certain mechanical elements of the locating station 12 will operate only if the way is clear at the left of and immediately adjacent the filling station. That is, the area immediately adjacent to and at the left of the filling station must be in readiness to receive a filled drum.

The valve 343, as shown in Figure 1, is located at the right or rearwardly of the drip pan 242. If the drip pan is pivoted clockwise as viewed in Figure 1 so as to be located beneath the filling lance 201, the valve 343 will be in its open, cam position, hence will allow pressure to flow from line 342 to line 344 and will constitute a signal that conditions at the filling station are in this respect appropriate for the forward progress of an empty, oriented drum. On the other hand, if the drip pan 242 is located to the left as shown in Figure 1, the valve 343 will be in the closed, spring position to prevent flow of pressure from line 342 to line 344 and will constitute a signal that conditions at the filling station are not appropriate for the forward progress of another drum from the locating station.

The purpose of the hand valve 345 is to allow an operator or inspector to stop the advance of drums from the locating and filling stations. This permits inspection of the scale of the weighing mechanism 15 (e. g. to check the accuracy of weighing), and it also permits other inspections to be made, without the necessity of shutting down the machine entirely.

The next step in the cycle of operation of the locating station is a forward stroke of the carriage 82. Conditions which must be satisfied before this next step, apart from the voluntary condition that the hand valve 345 be open, are that the way be cleared to the left and immediately adjacent the filling station 14 (i. e., the valve 341 is open) and that the drip pan 242 be underneath the lance 201 (i. e., the valve 343 is open). Under these conditions fluid pressure travels through the route described, thence from line 346 to the hydraulic pilot A of a valve 347. When this valve is placed in pilot A position, pressure is communicated from the main line 304 through the valve 347 to a line 348, thence to one end of the carriage travel cylinder 85 which is shown in Figures 1 and 3 as well as in the Figure 25. This results in forward movement of the carriage 82 to the position shown in Figure 3.

As explained hereinabove, this not only moves the drum B from the locating station to the filling station but, by virtue of the spring 100, it also pushes the preceding, filled drum C from the filling station. The bung locating finger 107 remains in the bung hole 13 by virtue of the fact that the frame 95 has not yet been raised. This position of the finger has two desirable effects: In the first place, by engagement with the sides of the bung hole it provides a mechanical connection between the drum and the frame 95 and carriage 82 to move the drum forwardly and, secondly, it prevents the drum from rotating on the conveyor rollers and insures that the bung hole is in registry with the lance when it is deposited at the filling station.

It is now necessary to remove the finger 107 from the bung hole 13 and to pivot or raise the frame 95 upwardly; to retract the carriage 82 and frame 95; and to pivot the drip pan 242 to the left so as to clear the way for the lance 141. These operations are accomplished by the means and in the manner which will now be described.

At the end of the forward stroke of carriage 82, an adjustable stop member 355 fixed to the frame of the machine contacts the rod 356 of a valve 357, as is most clearly shown in Figure 3. As shown in Figure 25, the valve 357 is supplied with air through a line 358. The valve 357 has two positions, one for admitting air through a line 359a to one end of the frame lifting cylinder 125 and the other for admitting air through a line 359b to the other end of cylinder 125. The cylinder 125 is most clearly shown in Figure 5 and it is also shown in Figure 25. When the rod 356 of valve 357 contacts the stop member 355 at the end of the forward stroke of the carriage 82, air is admitted through the line 359a to the upper end of cylinder 125 to pivot the bell crank lever 122 clockwise as viewed in Figures 5 and 8. During the first increment of this movement, the finger 121 on lever 122 rotates the finger 120 on shaft 105 (see Figure 6), thereby lifting the bung locating finger 107 from the bung hole and also, by rotating the cam 109, it allows the valve 319 to return to its closed, spring position. Air pressure is thereby relieved from the pilot 307A of valve 307; hence fluid pressure is now communicated from the main pressure line 304 and the branch line 310 through the valve 307 to the line 315, thence to one end of the cylinder 64 to close the exit gates 55. Pressure also flows through a branch line 370 to the pilot 306A of valve 306, which places this valve in a position to communicate pressure from the main line 304 and branch line 308 to the line 309, resulting in renewed operation of the hydraulic motors 59 which drive the drum rotating rollers 60. The second increment of movement of the lever 122, by reason of engagement thereof with the rear end 95a of frame 95, results in movement of the frame 95 from the down, horizontal position shown in Figure 5 to the up, tilted position shown in Figure 8. Upward movement of the frame 95 is limited by the stroke of the cylinder 125.

As the exit gates 55 close, contact member 335 is removed from the rod 337 of valve 338. As a consequence, valve 338 returns to its spring position in which it communicates pressure from the main pressure line 339 to a line 371, thence to the hydraulic pilot B of valve 347. This places valve 347 in a position to communicate pressure from the main pressure line 304 to a line 372, thence to one end of the carriage travel cylinder 85 to cause the carriage 82 to commence its return stroke.

Completion of the locating cycle requires opening of the entry gates 38, operation of the driven conveyor rollers 22 to move the next drum into position, closing of the gates 38 and lowering of the frame 95 with its bung locating finger 107. These operations are accomplished as follows:

A spring loaded valve 373 is provided which is shown in Figures 1, 3 and 4 fixed to the frame of the machine. The valve 373 is also shown in Figure 25. The valve 373, as is most clearly shown in Figures 3 and 4, has a rod 374 engageable with a cam 375 having low and high dwells 376 and 377, respectively. When in the cam position shown in Figures 1 and 3, the valve 373 communicates pressure from the main pressure line 339 and a branch line 378 to a line 379, thence to the hydraulic pilot A of valve 317. This places the valve 317 in a position to communicate pressure from the main pressure line 304 and branch line 316 to line 318, thence to one end of cylinder 61 to maintain the gates 38 in closed position as explained hereinabove.

One of the exit gates 55 is connected to a lever 385 by means of a slotted link 386. As the gates 55 are moving from the open position shown in Figure 3 to the closed position shown in Figure 4, the cam 375 will be rotated from the position shown in Figure 3 to the position shown in Figure 4 wherein the low dwell 376 of the cam is opposite the rod 374 of valve 373. This allows the valve 373 to return to its spring position and pressure is thereby communicated from the main pressure line 339 and branch line 378 to a line 390, thence to the pilot B of valve 317. This places the valve 317 in condition to communicate pressure from the main pressure line 304 and branch line 316 to a line 391, thence to the opposite end of cylinder 61, thereby causing the entry gates 38 to open. Pressure is also communicated through a branch line 392 to the hydraulic intake motor 23 (which is shown in Figure 11), to initiate operation of the driven rollers 22. Such operation moves the next drum into the locating station through the open gates 38.

As the drum enters the locating station it will contact a roller 393 at the outer end of the lever 385, which will rotate the cam 375 to the position shown in Figure 1 wherein the high dwell of such cam will contact the rod 374 of valve 373. This places the valve 373 in its cam position, to communicate pressure from the main pressure line 339 and branch line 378 to the line 379, thence to the hydraulic pilot A of valve 317. That valve is thereby placed in condition to communicate pressure from the main pressure line 304 and branch line 316 to the line 318, thence to one end of the cylinder 61 to close the entry gates 38. It will also be apparent that flow of pressure to the hydraulic motor 23 through valve 317 and line 392 will be terminated, and that the driven rollers 22 will therefor cease to rotate. As the entry gates 38 are closed, an adjustable contact member 396 on an arm 397 (see Figures 1, 3 and 4) contacts one end of the rod 356 of air valve 357 to admit air to the lower end of frame lifting cylinder 125, thereby lowering the frame 95 onto the drum.

*The weighing and filling station*

During the return stroke of carriage 82, a cam 410 carried thereby (see Figure 5) actuates a valve 411 which is fixed to the frame of the machine. The cam 410 is pivoted 412 and has a forward tongue 413 and a rearward cam surface 414. During the forward stroke of the carriage 82 the cam 410 merely rocks clockwise as viewed in Figure 5 without any effect upon the valve 411, but during the rearward stroke of the carriage a roller 415 on valve rod 416 rides up the cam surface 414 and then on to the dwell 417 of the cam.

The valve 411 is a spring loaded valve and, when placed momentarily in its cam position by this action of the cam 410, it communicates pressure from a main pressure line 304a and a branch line 418 to a line 419, thence to the passage 189 formed in the frame 154 of the weighing mechanism (see Figure 26). This passage is most clearly shown in Figure 14, and as explained hereinabove in connection with the weighing mechanism, the pulse of pressure thus delivered to the passage 189 pushes the plunger or piston 187 outwardly. It will be apparent that this pressure occurs only as a short pulse during retraction of the carriage 82, such pulse being of sufficient duration to effect the intended result. It will also be apparent that, after the cam 410 has passed the roller 415, the valve 411 will return to its normal spring position. As explained above the pulse of pressure applied to piston 187 has the effect of locking together the gross hand 146, which by now has tared an empty drum, to the net hand 149 so that henceforth, as the drum is being filled, these two hands will move together.

Another effect produced by this pressure pulse is as follows: Pressure passes from the line 419 through a branch line 425 to the hydraulic pilot A of a valve 426. This places the valve 426 in its pilot A position wherein it communicates pressure from a line 427 to a line 428, thence to one end of the drip pan cylinder 244 to pivot the same in counterclockwise direction as viewed in Figures 1 and 4, thereby moving it clear of the lance 141; i. e., so that the drip pan will assume the position shown in Figure 1. Pressure, however, can reach the line 427 only through the main pressure line 339, a branch 429 and a valve 430. The valve 430 is spring loaded and, as shown in Figures 19 and 20, it has a rod 431 which is engaged by a cam 432 only when the lance 141 is in its up position. Provided the lance is in such position, i. e., is clear of the drip pan, pressure can reach the drip pan cylinder 244 in the manner indicated.

Swinging of the drip pan 242 to the left as viewed in Figures 1 and 3 returns the valve 343 to its spring position and, by engaging the rod of a spring loaded valve 434, places the latter in its cam position. The function of the valve 343 is explained above; i. e., it is one of a chain of valves providing an interlock between the filling station 14 and the locating station 12 to insure proper functioning of the machine and synchronization of various elements thereof.

When the valve 434 is placed in its cam position, and provided the lance 141 is up (i. e., valve 430 is in cam position), pressure also flows from line 428 through a branch line 435 to the valve 434, thence through a line 436 to the hydraulic pilot A of a valve 437. Prior to this time, pressure is communicated to the lance lifting cylinder 204 through a line 438, the valve 437 and a line 439, all as more fully explained hereinafter. However, when the valve 437 is placed in its pilot A position in the manner just explained, this pressure supply is interrupted and the piston of cylinder 204 together with the lance 141 drop by gravity. Hydraulic fluid in the cylinder 204 drains through the line 439 and valve 437 to a sump.

When the lance 141 reaches its down position, which is illustrated in Figures 2 and 19, a bracket 445 shown in Figure 19 contacts an arm 446 of a switch 447 which energizes the solenoids, or electric pilots 448 and 449, of two spring loaded valves 450 and 451, respectively. These valves are shown in Figure 26. Energization of the solenoid 448 places the valve 450 in its electric pilot position, thereby closing that valve with respect to a line 452 and preventing the bleed of pressure through the side port 241 of lance operating cylinder 220. Energizing of the solenoid 449 places its valve 451 in electric pilot position, thereby communicating pressure from the pump 303 through the line 305 and valve 451 to a line 454, thence through the top port 240 of lance operating cylinder 220 into the upper end of that cylinder. This pressure moves the inner tube 210 of lance 141 to its fully open position, which is shown in Figure 22, thereby causing flow of liquid into the drum to commence the filling operation.

When a predetermined weight of liquid has been delivered to the drum, which is short of the final weight to be delivered, the net hand 149 of the weighing device 142 contacts a finger 458 protruding from a slot 459 in the scale 460, to de-energize a relay 461 through a sub-circuit which is generally indicated as 462. This and other sub-circuits hereinafter referred to in connection with Figure 26, are greatly simplified in that figure and are described in detail hereinafter as parts of the electric control circuit with reference to Figure 27. Current is supplied to energize the solenoid 449 through a main power lead 463, the switch 447 and a circuit 464 which includes the relay 461. When the relay 461 is de-energized, the solenoid 449 is de-energized, hence the valve 451 returns to its spring position. Pressure is now communicated through the main pressure line 305 and the valve 451 to a line 466, thence through bottom port 239 to the lower end of lance operating cylinder 220. As explained above, this has the effect of retracting the inner tube 210 of lance 141 to its "trim" position, i. e., to the position shown in Figures 23 and 24 wherein the tip 236 of rod extension 235, and the O-ring 237 are located within the top port 240, thereby closing the same.

This throttles the flow of liquid as described hereinabove, and as the filling and weighing proceed, the net hand 149 contacts a second finger 467 protruding through the slot 459 in scale 460. This occurs when the final, predetermined weight of liquid has been added and it de-energizes a relay 468 through a circuit generally indicated as 469. The relay 468 forms part of the circuit of the solenoid 448 of valve 450, such circuit being generally indicated as 470. Current is supplied to energize the solenoid 448 through the main power lead 463, the switch 447 and the circuit 479. When the relay 468 is de-energized, the solenoid 448 is also de-energized, thus allowing the valve 450 to return to its spring position. This opens the valve 450 in relation to the line 452 to allow bleed of pressure from the lance operating cylinder 220 through the side port 241 and line 452. This allows pressure beneath the piston 227 of this cylinder to push the rod extension 235 and O-ring 237 further into the top port 240, thereby completely retracting the inner tube 210 of the lance 141 and stopping altogether the flow of liquid from the lance. Return of the valve 450 to its spring position also communicates pressure from the main pressure line 304a to the line 438, thence through valve 437 to the line 439, thence to the lower end of the lance lifting cylinder 204 to raise the lance out of the drum. The valve 437 must be in its pilot B position for this to occur, and it is placed in such position by the following means: When the lance 141 descends to its down position, a bracket 490 carried with the lance (see Figures 19 and 25) contacts the rod of a valve 491 to place it in its cam position. Pressure then passes from main pressure line 304a and a branch line 492 through the valve 491 to a line 493, thence to pilot B of the valve 437. When the lance 141 is subsequently lifted to its up position, the valve 491 returns, of course, to its spring position, but valve 437 remains in its pilot B position until its next cycle of operation, when it is changed to its pilot A position in the manner described hereinabove.

At this stage of the weighing and filling cycle, an empty drum has been tared, then filled with a predetermined quantity of liquid. Then the filling lance has been closed and lifted from the drum. It is, however, necessary to pivot the drip pan 242 back underneath the lance to catch drippings therefrom. This operation is accomplished as follows:

Lowering of the lance 141 from its up position returns the valve 430 (see Figures 19 and 20) to its spring position, thereby communicating pressure from the main pressure line 339 and branch line 429 to a line 493, thence to pilot B of the valve 426 to place that valve on its pilot B position. When the lance 141 returns to its up position illustrated in Figure 20, the cam 432 places valve 430 again in its cam position, hence pressure is communicated from main pressure line 339 and branch line 429 through valve 430 to line 427, thence through valve 426 to a line 495, thence to the appropriate end of drip pan cylinder 244 to pivot the drip pan to a position beneath the lance.

An added safety feature is also incorporated in the hydraulic-pneumatic control system illustrated in Figures 25 and 26, such feature comprising a spring loaded valve 500 which is shown in Figure 25 and in Figures 19 and 20. As shown in Figure 25, the valve 500 is supplied continuously with hydraulic pressure through the main pressure line 304 and a branch line 501, and as shown in Figure 20, the plunger 502 of valve 500 is adapted to occupy a position beneath and in registry with one of the guide members 207a of the lance 141. As long as adequate fluid pressure is supplied by the pump 302, the rod 502 of valve will remain in its retracted position, but if the pressure supply is stopped voluntarily or if for any reason it is stopped involuntarily, then the spring of valve 500 will urge the rod 502 beneath the adjacent guide member 207b and, if the lance is in its up position, the rod 502 will hold the lance in that position.

Yet another feature of the control system is a two position hand valve 503 whose normal position directs flow of pressure to the control system. In its other position, valve 503 stops the machine and relieves hydraulic pressure from the control system. Another feature consists of a number of flow regulating valves, such as those shown at 504, which are manually adjustable and whose purpose is to control and adjust the speed of operation of various elements of the machine, such as the carriage shifting cylinder 85 and the gate operating cylinders 61 and 64.

Still another feature of the control system is a means for positively moving the net hand 149 of the weighing mechanism 142 back to zero after a filled drum has been removed from the scale platform 140. This comprises a cylinder 505 connected at its upper end by a line 505a to the line 348 and at its lower end by a line 505b to the line 372. The lines 348 and 372 are connected to opposite ends of the carriage shifting cylinder 85. The cylinder 505 has a piston 506 reciprocable therein which has a rod 506a which is slidably connected to a counterweight 507 which is in registry with the scale beam 508 of the weighing mechanism 142 and with a rod 508a affixed to the scale beam.

When pressure is communicated through the line 348 to the right hand end of the carriage shifting cylinder 85 as viewed in Figure 25, pressure will also be communicated through the line 505a to the upper end of cylinder 505, hence will move the rod 506a downwardly to deposit the counterweight 507 on the scale beam 508. This action occurs during the forward stroke of the carriage and the counterweight 507 remains on the scale beam 508 during a portion of the return stroke of the carriage 82, i. e., until the knob 506b on the lower end of the rod 506a contacts the top of counterweight 507. During this interval of time, the counterweight 507 effectively operates the scale beam 508 to positively rotate the net hand 149 to its zero position.

Yet another feature of the control system resides in the fact that the pump 303 shown in Figure 25 is a constant volume pump in which some of the liquid is by-passed. Hence, in a given unit of time the pump 303 delivers a definite, fixed volume of liquid to the lance operating cylinder 220. This insures a uniform and fast operation of the lance, which is advantageous because the full flow state of filling, i. e., before the net hand 149 contacts the finger 458 (see Figure 26) does not overlap the throttled flow stage (while the net hand is between the fingers 458 and 467), and the throttled flow stage does not extend beyond the calculated net weight to be delivered to the drum.

ELECTRICAL CONTROL SYSTEM

Referring now to Figure 27, an electrical control system is there shown for the machine illustrated in Figures 1 to 26. This system includes the solenoids 448 and 449, the relays 461 and 468 and the switch 447 which are mentioned above and are shown in Figure 26, and it also includes relays 510, 511 and 512 and electronic relays 513 and 514.

The machine is assumed to be in the stage of operation illustrated in Figure 1; i. e., a drum is at the locating station 12 and the bung locating finger 107 in the bung hole, and a barrel at the filling station 14 being filled with liquid. At this stage of operation the contacts 447a of switch 447 will be closed inasmuch as the lance 141 is in its down position and the bracket 445 is in contact with the switch arm 446 (see Figure 19). The solenoids 448 and 449 of valves 450 and 451, respectively, are energized as follows:

The relay 461 is energized through a power lead 515, a branch lead 515a, the normally closed contacts 513a of electronic relay 513, a lead 516, the coil of relay 461, a lead 517, the normally open contacts 461b of relay 461, a lead 518, the normally open contacts 468b of relay 468 and a lead 519 to ground. The relay 468 is energized through the power lead 515, a branch 515b, the normally closed contacts 514a of relay 514, a lead 525, the coil of relay 468, a lead 526, the lead 518, the contacts 468b of relay 468 and the lead 519.

Current is supplied to energize the solenoid 448 through the main power lead 463, contacts 447a of switch 447, a lead 528, the normally open contacts 510a of relay 510, a lead 529, the normally open contacts 468a of the relay 468, a lead 530, the normally closed contacts 511b of relay 511 (which remains deenergized during normal operation of the machine, as explained hereinafter), a lead 531, the coil of solenoid 448 and a lead 538a. Meanwhile relay 510 is energized to close its contacts 510a and 510b by a circuit including a power lead 532, the coil of relay 510, the normally closed contacts 533 of a mercury switch 534 (which is also shown in Figure 12), a lead 535, the normally open contacts 468d of relay 468 and a lead 536.

While a drum is being filled, the net weight of liquid is continuously indicated by the net hand 149 which meanwhile is rotating clockwise. When the net hand 149 of scale 460 strikes the first contact finger 458 (i. e., when a predetermined weight of liquid has been delivered which is short of the final quantity to be delivered), it closes a circuit which includes a lead 545, the hand 149, the finger 458, a lead 546, the coil of electronic relay 513 and a power lead 547. This results in energizing the electronic relay 513 which causes its normally closed contacts 513a to open. Hence the relay 461 is de-energized. This results in opening of the normally open contacts 461a and b and closing of the normally closed contacts 461c of relay 461.

The opening of contacts 461a de-energizes the solenoid 449 of valve 451. Hence, as explained hereinabove, the lance 141 is partially closed to assume its "trim" position which is illustrated in Figure 24. The closing of contacts 461c results in closing of the circuit of a magnet 548, such circuit including a power lead 549, a branch 549a, the coil of the magnet 548, a lead 550, the contacts 461c and a lead 551. The energizing of magnet 548 causes it to retract the first contact finger 458 within the slot 459, hence permits the hand 149 to proceed. When the hand 149 strikes the second contact finger 467, i. e., when the final predetermined weight of liquid has been delivered to a drum, the electronic relay 514 is energized through a circuit which includes the lead 545, the hand 149, the finger 467, a lead 552, the coil of relay 514 and a power lead 553.

The energizing of electronic relay 514 results in opening of its normally closed contacts 514a which in turn results in de-energizing the relay 468. This results in opening of the normally open contacts 468a, b and d and closing of the normally closed contacts 468c of the relay 468. The opening of contacts 468a de-energizes the solenoid 448 of valve 450, hence causes complete closing of the lance and lifting thereof from the drum in the manner explained hereinabove. Closing of the contacts 468c energizes a magnet 554 by means of a circuit including the power lead 549, a branch 549b, the coil of magnet 554, a lead 555, the contacts 468c and a lead 556. The energizing of the magnet 554 results in retracting the second contact finger 467 within the slot 459 to allow the net hand 149 to register the true net weight on the scale 460. Meanwhile a holding circuit including leads 535a and 535b and the contacts 510b maintains relay 510 in energized condition.

When the hand 149 returns to zero, it unlatches the scale mechanism in the manner described hereinabove, i. e., by contact of the finger 196 with the latch lever 177. Referring to Figure 12, it will be seen that the left-hand end of the outer yoke 161 has a permanent magnet 565 adjustably fixed thereto, as by means of a screw 566. The magnet 565 is in registry with the mercury switch 534 referred to hereinabove. The switch 534 is of known construction and operation, and it embodies the contacts 533 shown in Figure 27. The contacts 533 are of the normally closed type, but when the magnet 565 is brought close to the switch 534, as shown in Figure 16, it opens these contacts.

The magnet 565 is brought close to the switch 434 when the net hand 149 returns to its zero position and unlatches the outer yoke 161. Therefore, return of the net hand 149 to its zero position results in the opening of contacts 533 of switch 534. Referring again to Figure 27, it will be seen that this results in de-energizing the relay 510 which, in turn, results in opening of its normally open contacts 510a and b and closing of its normally closed contacts 510c. The opening of the contacts 510a cuts off the main power supply to solenoids 448 and 449. These solenoids were de-energized at a previous stage of the cycle of operation, as explained hereinabove. The purpose of this additional operation will be apparent from the explanation hereinafter.

The closing of contacts 510c re-energizes the relay 461 but through a different circuit which comprises the power lead 515, branch 515a, the contacts 513a of electronic relay 513, the lead 516, the coil of relay 461, the lead 517, a lead 568, the contacts 510c of relay 510 and a lead 569.

The energizing of relay 461 closes its normally open contacts 461a and b and opens its normally closed contacts 461c. The closing of contacts 461b re-energizes the relay 468. The closing of contacts 461a places the circuit of the solenoid 449 of valve 451 in condition to energize that solenoid when the contacts 533 of switch 534 and the contacts 447a of switch 447 are again closed. The opening of contacts 461c of relay 461 de-energizes the magnet 548, thereby allowing the first contact finger 458 to come up again and protrude through the slot 459.

As explained hereinabove, after a drum has been completely filled the lance is lifted from the drum. As a consequence the bracket 445 is removed from contact with the arm 446 of switch 447 (see Figure 19). With reference to the circuit diagram in Figure 27, this means that the contacts 447a of the main power switch 447 are opened and the contacts 447b thereof are closed.

The energizing of relay 468 in the manner described above, closes its normally open contacts 468a, b and d and opens its normally closed contacts 468c. The closing of contacts 468a places the circuit of solenoid 448 of valve 450 in condition to energize that solenoid when the contacts 447a of switch 447 are again closed and when the relay 510 is again energized and its contacts 510a are closed. The opening of contacts 468c of relay 468 de-energizes the magnet 554 to allow the second contact finger 467 to come out again and protrude through the slot 459. The closing of contacts 468d of relay 468 places the circuit of relay 510 in condition to close when the contacts 533 of mercury switch 534 are again closed.

As explained above, when the scale mechanism is reset or re-cocked by a pressure pulse to the cylinder 188, the magnet 565 moves away from the mercury switch 534, hence its contacts 533 are again free to close. This operation occurs during the return stroke of the carriage 82 and it is timed to allow the drum which has just been deposited on the scale platform 140 to come to rest, and to allow the gross hand 146 to tare the empty drum. As explained hereinabove, the scale mechanism is re-cocked by the action of cam 410 on the rod 416 of valve 411. The distance which the carriage 82 (which supports the cam 410) must travel before the action occurs is such that the necessary time lag is provided. As explained hereinabove, the pressure pulse to cylinder 188 also has the effect of pivoting the drip pan cylinder to the left, as viewed in Figure 1, so as to clear the lance 141; and it also has the effect of relieving pressure in the lance lifting cylinder 204, hence lowering the lance through the bung hole of the drum at the filling station. When the lance descends, the contacts 447a of switch 447 are again closed. This energizes the solenoids 448 and 449 and completes a cycle of the automatic operation of the electrical control system.

In addition to the automatic electrical control means described hereinabove with reference to Figure 27, a manual electrical control means is also provided. This manual control means is for the purpose of inspecting and for draining the lance 141. It includes a normally closed manual switch 590 and a normally open push button switch 591 having two pairs of contacts 592 and 593. Current is supplied to the manual circuit through the main power lead 463, the contacts 447b of switch 447 (which are closed when the lance is in the up position), a lead 594, normally closed contacts 512a of relay 512 and a lead 596. As the push button switch 591 is closed and is held closed, the relay 511 will be energized through the contacts 592, a lead 597 and the switch 590, the coil of the relay 511 and a lead 598. The energizing of relay 511 closes its normally open contacts 511a and c and opens its normally closed contacts 511b. Current reaches the solenoid 448 of valve 450 through a lead 605, the closed contacts 511c, a lead 606 and the lead 531. As long as the switch 591 is held in closed position, current will also reach the solenoid 449 of valve 451 through a lead 607, the closed contacts 593 of switch 591 and a lead 608.

As long as both solenoids 448 and 449 are maintained in the energized condition, the lance 141 will of course remain in its fully open position. If it is desired to place the lance in its trim position, the switch 591 is released, thereby opening the circuit of the solenoid 449 and de-energizing that solenoid. In the meantime, the solenoid 448 of valve 450 will remain energized through a holding circuit as follows: Current flows through a lead 610, the closed contacts 511a of relay 511, thence through a lead 611 to the lead 597, thence through the coil of relay 511 to lead 598. This constitutes a holding circuit to maintain the relay 511 in energized condition, thereby maintaining its contacts 511c in closed position and allowing current to flow from the lead 597 to the lead 605, thence through the closed contacts 511c and the lead 606 to the lead 531, thence to the solenoid 448.

With the solenoid 449 thus de-energized and the solenoid 448 energized, the lance 141 will necessarily move to its trim position. When it is desired to close the lance altogether, the switch 590 is momentarily opened, which de-energizes the solenoid 448.

Since it is not desirable to carry out the manual operations if liquid is being pumped to the lance, an additional safety feature is provided. Thus the contacts 512a of relay 512, through which the manual circuit obtains its current, are normally closed. They are, however, opened when the relay 512 is energized. The relay 512 is connected through leads 612 and 613 to the circuit of the filling motor (not shown) which is employed for pumping liquid to the lance. Hence the manual circuit is not operable unless the filling motor is off. An additional feature consists of pilot lights shown at 615 and 617. These pilot lights indicate that the solenoids 448 and 449, respectively, are energized. Yet another feature resides in the fact that, for this manual control to be operable, the lance 141 must be in its up position. Thus, power for the manual circuit must come through the contacts 447b of switch 447, and these contacts are closed only when the lance is up.

The control circuit of Figure 27 has still further safety features. Thus, should the electric power for the control circuit fail, solenoids 448 and 449 will be de-energized, hence will close and raise the lance. If the net hand 149 should fail to return to zero after a filled drum has been removed from the scale platform 140, the scale mechanism will remain in the cocked condition shown in Figure 12; hence the next drum cannot be filled. If the net hand 149 becomes disengaged from the gross hand 146 during the filling operation, the lance will close and will be raised from the drum. Yet another safety feature resides in a pressure switch 620 which is shown in Figure 26 as being connected by a line 305a to the line 305 which is supplied with hydraulic pressure by the pump 303. The pressure switch 620 connects leads 621 and 622 which form part of the circuit of the filling motor (not shown). As long as pressure exists in line 305 (i. e., as long as pump 303 is operating), the switch 620 remains closed, but should the pump 303 stop, switch 620 will open, hence the filling motor will stop. Inasmuch as it is the pump 303 which supplies pressure for closing the lance 141, and should the necessary closing pressure from pump 303 fail, the filling motor and pump will be stopped.

It will be apparent that the machine of the present invention as described hereinabove and as illustrated in the accompanying drawings, possesses a number of advantageous features. Thus it is automatic in its operation; it automatically feeds drums or barrels with their bung holes in random location to a bung locating station; it orients the bung holes automatically; and it feeds the oriented drums automatically to a filling station, meanwhile keeping the drums in their oriented positions such that the bung hole of each drum is brought into precise registry with a filling mechanism. Also, each drum is automatically tared and is then automatically filled to a predetermined net weight. In this filling operation a condition of rapid flow is maintained during the greater part of the filling cycle and the flow is then automatically throttled. Meanwhile the conditions of filling (the slotted tube, the inter-acting jets and the submerged filling close to the bottom of the drum) minimize foaming and reaction against the weighing mechanism. Finally, each filled drum is automatically pushed clear of the filling station to make way for the next drum. A control system is provided for synchronizing the various mechanical operations, and such system includes safety features which allow progress of drums through the machine and certain other operations only if proper conditions exist. The machine, including the mechanical, hydraulic, pneumatic and electrical elements thereof, functions at high speed; it is capable of lengthy runs without shutdown for repairs; and it fills drums within close tolerances. By adjustment of the fingers 458 and 467 within the slot 459 of scale 460 (see Figure 26), the machine can be adjusted for different filling conditions; e. g., for drums of a different capacity and for products of different density. Numerous refinements are incorporated in the machine which add to its dependability; e. g., the provision of a low roller at 20a (see Figure 11), the provision of raised rollers at 35a (see Figure 2); and the provision of a drip pan at 242 to catch drippings from the lance.

It will be apparent that the machine of the present invention, and certain elements thereof, have applications apart from the drum filling operation described hereinabove wherein empty drums are automatically oriented, tared and filled to a predetermined net weight. Among such applications there may be mentioned the following:

In certain instances it is necessary to fill drums to a predetermined gross weight, i. e., weight of the empty drum plus the weight of liquid. Thus, drums of uniform weight may be supplied, in which event it is not necessary to tare the drums. Or a customer may order drums filled to a predetermined gross weight regardless of the variations in the empty weight of the drums. In such a case, an ordinary weighing mechanism or scale will be employed without the taring and net weighing apparatus illustrated in Figures 12 to 17. Such scale may be provided with a retractable pin or its equivalent to contact the single hand of the scale to provide a signal for terminating the filling operation when a predetermined gross weight is registered. Preferably, of course, a pair of such fingers, such as those shown at 458 and 467 in Figure 26, will be employed to provide full flow and throttled flow operation as described hereinabove.

Another example of an application of the mechanisms herein set forth is the use of the locating mechanism shown at 12. This operation may be employed generally to locate or orient vessels having bung holes or the like, and it is not essential that the bung holes be located at the top of an upright drum. By suitable transposition of elements side bung holes may be located, and by employing a counterweighted locating finger, bottom bung holes may be located, e. g., to orient drums which are up-ended, to register them with a nozzle for a cleaning operation.

The filling mechanism may be employed generally to fill vessels. Thus the retractable lance, its slotted, converging outlets and the step-wise filling operation (full flow followed by throttled flow) can be employed with advantage in many different types of filling operation.

We claim:

1. In a filling device for filling drums with liquid, the combination of a lance mechanism comprising inner and outer tubes arranged for relative movement to extend and retract the inner tube between a fully open, extended position and a fully closed, retracted position, respectively, said inner tube being formed with an end closure and with openings spaced inwardly thereof for flow of liquid; means for lowering said lance mechanism into and removing it from a drum through the bung hole thereof; means for extending and retracting said inner tube; and control means for carrying out successively a cycle of operation in which the lance mechanism is lowered into the drum with the inner tube in fully retracted position, then extending the inner tube to fully open position, then partially retracting the inner tube to throttle without stopping the flow of liquid, then fully retracting the inner tube and withdrawing the lance mechanism from the drum.

2. A filling device comprising a tube having an open end for delivery of liquid to a drum or the like, an end fitting for the open end of said tube having a closure member for closing said open end when in a first axial position relative to the tube, said fitting and closure member allowing throttled flow when in a second axial position and rapid flow when in a third axial position; and operating means for said end fitting and closure member comprising a cylinder, a double acting piston within said cylinder, and a rod connecting said piston and end fitting; said cylinder being provided with ports for passage of fluid to and from the cylinder for operating the piston to move said end fitting between its first and third positions, and means for closing certain of said ports to interrupt operation of the piston when the end fitting is at its second position.

3. In a filling device of the type comprising a tube, an end closure therefor capable of assuming a first fully open position to allow rapid flow of liquid from said tube, a second, throttled position to allow reduced flow of liquid and a third closed position to terminate flow of liquid, and means for operating said closure member comprising a cylinder, a piston slidable therein and a rod connecting said piston with said closure member, the improvement which comprises a fluid passage for said cylinder on one side of said piston adapted to admit fluid to operate the piston to move the closure member from said first position to said third position, first and second fluid passages on the opposite side of said piston, a normally closed valve normally closing said second passage, a valve moving with said piston and operable, when said closure member is in said second position, to close said first passage, and means for opening said normally closed valve after a predetermined increment of liquid has been delivered by said device.

4. A liquid delivery device comprising an outer tube having an open delivery end and an inlet spaced axially therefrom; an inner valve tube having a closed end and a fluid passage spaced axially therefrom; said tubes being so arranged that, when the inner tube is in a first, extended position rapid flow of liquid through said fluid passage will be permitted, when in a second partially retracted position, a reduced flow of liquid through said passage will be permitted and when in a third, fully retracted position, the open end of said outer tube will be completely closed and flow of liquid therefrom will terminate; and fluid pressure means for operating said inner tube, said means comprising a sealing cylinder connected at one end to the inlet end of said outer tube, a sealing piston therein, an operating cylinder connected to the other end of the sealing cylinder, an operating piston slidable therein, rod means operatively connecting said sealing piston with said inner tube and with said operating piston, pressure inlet means for operating said operating piston to move the inner tube from its first extended position to its third, closed position, a first, normally open fluid outlet means to bleed fluid from the operating cylinder during such movement of the operating piston, valve means associated with said operating piston to close said first outlet when said inner tube is in said second position, a second, normally closed fluid outlet to bleed pressure from said operating cylinder in response to movement thereof, and means for opening said second outlet after a predetermined quantity of liquid has been delivered.

5. A filling device adapted to fill barrels with lubricating oil and other liquids tending to foam when mixed with air comprising an outer sheathing tube having an open end, an inner perforated tube slidable within said outer tube and through said open end and a closure for one end of said inner tube, said closure being adapted, when the inner tube is in fully retracted position, to close the open end of the outer tube, said inner tube being formed with slots for egress of liquid, said slots being disposed inwardly from said closure and being arranged in converging pairs to produce converging streams of liquid.

6. A filling device for rapidly filling drums and the like having bung holes comprising a platform for supporting a vessel such as a drum having a bung hole, a tube for extending through such bung hole into the vessel, and means mounting such tube for lowering through such bung hole to a point adjacent the bottom of the vessel, said tube having a closed lower end and being formed with a plurality of slots for egress of fluid from the tube into the vessel, said slots being located at the lower end of the tube such that liquid is delivered only to the lower end of the vessel and the bulk of the filling operation is carried out while the slots are submerged in liquid, said slots being disposed about the periphery of the tube and being arranged in outwardly converging pairs to produce jets of liquid which converge immediately adjacent the exterior surface of the tube.

7. A method of filling vessels such as drums, barrels and the like each having a top cover with a bung hole therein which comprises providing an extensible lance including a tube having an open lower end and an extensible valve member for such open lower end, said valve member being capable of assuming an extended position for rapid flow, a retracted position for no flow and an intermediate position for reduced flow of liquid from the open lower end of said tube; bringing such vessels in sequence to and depositing them at a filling station in registry with said lance; lowering the lance through the bung hole of each such vessel to a position near the bottom of the vessel; extending the valve member of said lance to its extended position to cause rapid flow of liquid and rapid filling of the vessel; partially retracting the said valve member, prior to delivery of the desired final quantity of liquid to the vessel, to cause it to assume its intermediate position; continuing reduced flow of liquid until the desired final quantity thereof has been delivered to the vessel; then retracting the said valve member to its retracted position and withdrawing the lance through said bung hole.

8. A filling device adapted to fill barrels with oil comprising a tube closed at one end, having an inlet for liquid spaced from such closed end and formed with a plurality of slots extending through the walls of the tube between said closed end and inlet; said device also comprising an outer closure member, said tube and closure member being extensible and retractable relatively to one another to be capable of assuming a closed position wherein liquid flow through said slots is prevented and an open position wherein said flow is permitted; said slots being arranged in converging pairs to produce streams of liquid impinging upon one another externally of the tube.

9. A filling device adapted to fill barrels with oil comprising a tube closed at one end, having an inlet for liquid spaced from such closed end, and formed with a plurality of slots extending through the walls of the tube between said closed end and inlet; said device also comprising an outer closure member, said tube and closure member being extensible and retractable relatively to one another to be capable of assuming a closed position wherein liquid flow through said slots is prevented and an open position wherein said flow is permitted; said slots being arranged in converging pairs to produce streams of liquid impinging upon one another externally of the tube, each such slot having dimensions such as to effect relatively little pressure reduction and atomization of liquid issuing therethrough.

10. A filling device for rapid filling of containers with a liquid under conditions tending to create excessive foam which comprises a support for such containers, a filling device held above said support for vertical movement between raised and lowered positions for clearing and entering a container, respectively, and means for so moving said device; said device comprising a vertical tubular member having a closed lower end and an inlet above said closed lower end for inflow of liquid under pressure, said tubular member being formed with a large number of outlet orifices permitting rapid outflow of liquid, said orifices being small in individual cross section and large in total cross section compared to the horizontal cross section of the interior of the tubular member such that rapid outflow of liquid is permitted, said orifices being distributed symmetrically with respect to the axis of said tubular member to cause outflow of liquid uniformly about said axis.

11. A filling device for rapid filling of containers with a liquid under conditions tending to create excessive foam which comprises an inner tubular member and an outer tubular member, said members being telescopically arranged and capable of relative movement between an extended position wherein the inner member is exposed and a retracted position wherein it is enclosed by the outer member, said inner member having an end closure for closing the device when in the retracted position, said inner member having a plurality of outlet openings located to be exposed when the device is in its extended position, said outlet openings being of small dimensions individually compared to the cross section of the inner member, being great in number to provide a large total outlet area and being arranged about the axis of the inner member so as to distribute outflowing liquid substantially uniformly about said axis.

12. The device of claim 11 including also means supporting said inner and outer members in vertical position and allowing vertical movement between a raised position and a lower position, means for automatically moving said members between said positions, and means for automatically extending and retracting said inner member.

13. The device of claim 12, including also means for delivering liquid at high pressure to the interior of said inner member.

14. Filling apparatus of the character described comprising a scale platform for supporting a container, automatic weighing means for automatically weighing a container and its content supported by said platform, a filling device comprising a stationary framework and a filling device supported thereby for movement between a raised position to clear a container and a lower position to enter a container on said platform, and means for so moving said device; said filling device comprising inner and outer telescopically arranged tubes slidable axially relatively to one another between extended and retracted positions exposing and enclosing the inner tube, respectively; said inner tube having an end closure to cap and close the device when in retracted position; said inner tube being formed with a large number of small orifices permitting radial outflow of liquid from the inner tube, said orifices being of small cross sectional area individually but of sufficiently great number to provide a large total cross sectional area to permit rapid outflow of liquid, said orifices being arranged uniformly about the axis of the inner member to distribute the outflowing liquid uniformly about such axis; said apparatus also comprising means for extending and retracting said inner member and means for carrying out automatically a cycle of operation wherein an empty container is deposited on said platform, said device is moved to its lower position, said inner member is extended, liquid flows through said orifices into the container, and the inner member is retracted and the device is raised when a predetermined weight is registered by the weighing mechanism.

15. A liquid delivery device comprising a tube, an end closure therefor capable of assuming first, second and third axial positions in relation to said tube allowing rapid flow, throttled flow and no flow of liquid therefrom, respectively; means for operating said closure comprising fluid pressure supply means and a cylinder having a first fluid passage at one end and second and third fluid passages at its other end, a piston slidable within said cylinder between said first passage and said second and third passages, a rod connecting said piston with said closure, a valve member carried by said piston and so arranged as to close said second passage when the closure is in said second axial position, a control valve for closing and opening said third passage, weighing means for supporting a vessel and for continuously weighing its liquid content, and control means operatively connecting said weighing means with said pressure supply means and with said control valve whereby, when a first, predetermined increment of liquid has been delivered to said vessel, fluid pressure will be supplied through said first passage to move said closure to its second axial position and to close said second passage, whereby said control valve will remain closed while a second increment of liquid is delivered to said vessel, and whereby said control valve will open when said second increment has been delivered to said vessel.

16. A filling device comprising: a lance for delivering liquid to a drum, means mounting the lance for entry into and withdrawal from such drum through its bung hole, and a closure for said lance, said closure being movable between a first position for rapid flow, a second position for reduced flow and a third position for no flow of liquid from the lance; means for so operating said closure comprising a cylinder and a piston movable therein, passages for entry and egress of fluid to and from said cylinder for operating the piston, a first valve for delivering fluid to the cylinder to move the closure member from its first position to its third position, a second valve for terminating bleed of fluid from the cylinder in response to such movement of the piston, said second valve closing automatically when the closure member assumes its second position, and a third valve for bleed of fluid from the cylinder in response to such movement of the piston; weighing means for continuously weighing such drum and its liquid content; and an electrical circuit for operating said first and third valves, said circuit being responsive to said weighing means to open said first valve when a predetermined weight has been registered by the weighing means and to open said third valve when a further, predetermined increment of liquid has been added to said vessel.

17. A net weighing and filling system comprising: a weighing mechanism including a platform for supporting a drum and means for taring and then net weighing a drum on said platform; drum shifting means for automatically delivering a drum to the platform and means for then automatically retracting the drum shifting means and for initiating the net weighing operation of said weighing mechanism during retraction of such drum shifting means; a lance including a retractable closure member capable of assuming a first, fully open position, a second, partially closed position and a third, fully closed position, means mounting such lance for lowering the same into and lifting it from a drum on said platform through the bung hole of the drum; a cylinder and a double-acting piston therein for operating said closure member, said cylinder having a first port at its lower end and second and third ports at its upper end; a first, electrically operated valve for said first port, a second valve associated with said piston to close said second port when the closure member is in its second position, and a third, electrically-operated valve for said third port; means for automatically lowering the lance and for introducing fluid pressure through said second port when the drum has been tared to move the closure member to its first position; an electrical circuit including a master switch for energizing such circuit only when the lance is in its lowered position, means responsive to operation of the weighing mechanism to automatically open said first valve when a predetermined net weight of the liquid has been registered by the weighing mechanism, and means responsive to operation of the weighing mechanism to automatically open said third valve when a further, predetermined increment of liquid has been delivered to the drum and registered by the weighing mechanism.

18. Automatic filling means for rapid filling of drums and other like vessels with a predetermined weight of liquid, which comprises: a weighing mechanism for continuously weighing such vessel and its content, said mechanism including a weighing platform for supporting the vessel; a filling mechanism including a tubular member mounted for movement between an up position to clear a vessel on said platform and a down position within said vessel; inlet means for supplying liquid to said tubular member and a valve for said tubular member movable between an open position for flow of liquid to a vessel and a closed position for terminating such flow; and control means operable when a vessel has been deposited on said platform to automatically move said tubular member to its down position, then move said valve to its open position, then move said valve to its closed position when a predetermined weight is registered on said weighing mechanism and restore said tubular member to its up position.

References Cited in the file of this patent

UNITED STATES PATENTS

| | | |
|---|---|---|
| 388,930 | Thayer | Sept. 4, 1888 |
| 620,877 | Bassett | Mar. 14, 1899 |
| 651,651 | Colby | June 12, 1900 |
| 1,106,679 | Randall | Aug. 11, 1914 |
| 1,155,009 | Schlangen | Sept. 28, 1915 |
| 1,180,807 | Vedder | Apr. 25, 1916 |
| 1,924,025 | Clark | Aug. 22, 1933 |
| 2,066,169 | Zwosta | Dec. 29, 1936 |
| 2,648,479 | Martin | Aug. 11, 1953 |